(12) United States Patent  
Morikuni

(10) Patent No.: US 8,955,981 B2  
(45) Date of Patent: *Feb. 17, 2015

(54) PROJECTOR, PROJECTION UNIT, AND INTERACTIVE BOARD

(75) Inventor: Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 13/428,593

(22) Filed: Mar. 23, 2012

(65) Prior Publication Data

US 2012/0249979 A1 Oct. 4, 2012

(30) Foreign Application Priority Data

Apr. 1, 2011 (JP) ................................. 2011-081648  
May 26, 2011 (JP) ................................. 2011-117677

(51) Int. Cl.
*G03B 21/14* (2006.01)  
*G03B 21/28* (2006.01)  
*G02B 17/08* (2006.01)  
(Continued)

(52) U.S. Cl.  
CPC ............ *G03B 21/28* (2013.01); *G02B 17/0896* (2013.01); *G03B 21/147* (2013.01); *G03B 21/62* (2013.01); *G03B 21/10* (2013.01); *G03B 21/2073* (2013.01)  
USPC .................. 353/38; 353/30; 353/98; 353/100

(58) Field of Classification Search  
CPC .. G02B 17/08; G02B 17/086; G02B 17/0852; G03B 21/16; G03B 21/28  
USPC .......... 353/30, 31, 34, 37, 38, 88, 98, 99, 100, 353/101; 348/744–747, E5.137, E9.027; 359/217.1, 219.2, 443; 349/5, 7–9  
See application file for complete search history.

(56) References Cited

U.S. PATENT DOCUMENTS 5,521,659 A    5/1996   Arnott  
5,539,579 A *   7/1996   Miyatake et al. ............. 359/634  
(Continued)

FOREIGN PATENT DOCUMENTS

CN          1906519 A    1/2007  
CN       101533207 A    9/2009  
(Continued)

OTHER PUBLICATIONS

Jul. 17, 2014 Office Action issued in U.S. Appl. No. 13/428,368.  
(Continued)

*Primary Examiner* — Sultan Chowdhury  
(74) *Attorney, Agent, or Firm* — Oliff PLC

(57) ABSTRACT

A projector includes: a main body section including a light source, a display surface illuminated by light from the light source, and an emission optical system adapted to emit light from the display surface; and a projection unit adapted to project light from the display surface toward an irradiated surface, the light being emitted from the emission optical system, wherein the projection unit includes an image plane control optical system adapted to change the light emitted from the emission optical system to light forming an image plane of the display surface tilted with respect to the display surface, and an angle-widening mirror with a concave surface having positive power and adapted to reflect light forming an image plane of the display surface tilted with respect to the display surface and widen an angle of the light.

18 Claims, 26 Drawing Sheets

(51) Int. Cl.
*G03B 21/62* (2014.01)
*G03B 21/10* (2006.01)
*G03B 21/20* (2006.01)

(56) References Cited

U.S. PATENT DOCUMENTS

| | | | |
|---|---|---|---|
| 6,631,994 B2* | 10/2003 | Suzuki et al. | 353/77 |
| 7,967,448 B2* | 6/2011 | Destain | 353/77 |
| 8,403,505 B2* | 3/2013 | Dai | 353/119 |
| 8,425,041 B2* | 4/2013 | Schuck et al. | 353/7 |
| 8,425,042 B2* | 4/2013 | Hruska et al. | 353/7 |
| 8,540,379 B2* | 9/2013 | Jikuya et al. | 353/119 |
| 2001/0048558 A1 | 12/2001 | Lin | |
| 2002/0191161 A1* | 12/2002 | Baba et al. | 353/98 |
| 2004/0174611 A1 | 9/2004 | Hatakeyama | |
| 2007/0132961 A1* | 6/2007 | Kuroki et al. | 353/31 |
| 2007/0184368 A1 | 8/2007 | Nishikawa et al. | |
| 2007/0216877 A1* | 9/2007 | Sacre et al. | 353/97 |
| 2008/0252860 A1* | 10/2008 | Matsumoto et al. | 353/70 |
| 2009/0168031 A1* | 7/2009 | Imaoka et al. | 353/99 |
| 2009/0225233 A1 | 9/2009 | Hirata et al. | |
| 2009/0231690 A1 | 9/2009 | Nishikawa et al. | |
| 2009/0279055 A1* | 11/2009 | Amano | 353/101 |
| 2010/0053737 A1* | 3/2010 | Fujita et al. | 359/364 |
| 2010/0141907 A1 | 6/2010 | Hirata et al. | |
| 2010/0238414 A1* | 9/2010 | Togino | 353/38 |
| 2010/0238416 A1* | 9/2010 | Kuwata et al. | 353/69 |
| 2010/0277703 A1* | 11/2010 | Hisada et al. | 353/98 |
| 2011/0122328 A1* | 5/2011 | Hirata et al. | 349/5 |

FOREIGN PATENT DOCUMENTS

| | | |
|---|---|---|
| JP | A-6-11767 | 1/1994 |
| JP | A-06-011767 | 1/1994 |
| JP | A-2002-006398 | 1/2002 |
| JP | A-2003-136892 | 5/2003 |
| JP | A-2004-252345 | 9/2004 |
| JP | A-2004-295107 | 10/2004 |
| JP | A-2007-011248 | 1/2007 |
| JP | A-2007-11248 | 1/2007 |
| JP | A-2008-083428 | 4/2008 |
| JP | A-2008-83428 | 4/2008 |
| JP | A-2008-090200 | 4/2008 |
| JP | A-2008-90200 | 4/2008 |
| JP | A-2009-083277 | 4/2009 |
| JP | A-2009-122587 | 6/2009 |

OTHER PUBLICATIONS

Co-pending U.S. Appl. No. 13/428,368, filed Mar. 23, 2012.

* cited by examiner

PROJECTOR, PROJECTION UNIT, AND INTERACTIVE BOARD

BACKGROUND

1. Technical Field

The present invention relates to a projector, a projection unit, and an interactive board, and in particular to a projector for ultra-short projection.

2. Related Art

In recent years, projectors each provided with a projection optical system for so-called ultra-short projection, which makes it possible to display a large screen with a short projection distance, have been put into product. By adopting such a projection optical system, it has become possible to display a large screen with a super short distance (e.g., a 100-inch screen with the projection distance of 40 cm) compared to existing front projection projectors. Such projectors are generally made usable only for super short-distance projection, and are expected to make it possible to be used for the super short-distance projection and the medium and long-distance projection of existing well-known projectors in accordance with the purposes. In, for example, JP-A-2002-6398 (Document 1), there is proposed a technology of a projector, which increases the zoom ratio using a reflective projection unit attached on the screen side with respect to the projection lens. It becomes possible to obtain an image with different zoom ratio between the state of attaching the reflective projection unit and the state of detaching it.

If the reflective projection unit according to Document 1 is applied to the super short-distance projection, there arises a necessity of substantially increasing the zoom ratio. On this occasion, the higher the zoom ratio is set, the more difficult it becomes to reduce the aberration. Further, since the configuration of disposing a plurality of curved mirrors eccentrically with respect to the optical axis (the center axis) of the lens is adopted, the case in which a minute displacement in the optical element or the like significantly affects the image increases. Therefore, an extremely accurate adjustment is required for obtaining a desired optical performance, and moreover, it becomes also difficult to reduce the aberration due to the eccentric optical system.

Further, in recent years, due to the increase in multimedia contents, a so-called interactive board used in the education field or presentations has been becoming in widespread use. The interactive board has a feature of being capable of displaying a content and at the same time allowing the user to make insertion to the content. Since the interactive board generally has a size substantially the same as those of existing blackboards or whiteboards, it results that display in relatively wide range is required. If an ordinary direct view monitor is applied to the wide-range display in the interactive board, there arises a problem in the weight, the power consumption, and the cost of the whole device.

In, for example, JP-A-2003-136892 (Document 2) and JP-A-2004-252345 (Document 3), there is proposed a technology of an interactive board which reflects the projected light from a projector with a planar mirror to thereby input it into a transmissive screen. In JP-A-2009-83277 (Document 4) there is proposed a technology of an interactive board provided with a projector for super short-distance projection. By the enlarged projection using a projector, display in a wide range is made possible. By using a projector, reduction in weight, power consumption, and cost becomes possible. It should be noted that in the technologies of Documents 2 and 3, there arises a problem that the size in the depth direction grows to thereby degrade facility of installation since the large planar mirror disposed at an angle with the transmissive screen. The projector in the technology of Document 4 is only applied to the super short-distance projection, and has a problem that it is low in convenience because of the limited usage.

SUMMARY

An advantage of some aspects of the invention is to provide a projector and a projection unit used for the projector for realizing display of an image by the ultra-short projection with a super short distance and display of an image by the projection with a middle or long distance.

Another advantage of some aspects of the invention is to provide a convenient interactive board capable of reducing the weight, the power consumption, and the cost, and suppressing the depth size.

An aspect of the invention is directed to a projector including a main body section including a light source, a display surface illuminated by light from the light source, and an emission optical system adapted to emit light from the display surface, and a projection unit adapted to project light from the display surface toward an irradiated surface, the light being emitted from the emission optical system, wherein the projection unit includes an image control optical system adapted to change the light emitted from the emission optical system to light forming an image plane of the display surface tilted with respect to the display surface, and an angle-widening mirror with a concave surface having positive power and adapted to reflect light forming an image plane of the display surface tilted with respect to the display surface and widen an angle of the light.

In the projector described above, the main body section and the projection unit are combined with each other to thereby make the super short-distance projection possible. In the state in which the projection unit is detached, the main body section makes it possible to perform the middle and long-distance projection by itself. By combining the main body section and the projection unit with each other, it is possible to tilt the image plane of the display surface without applying a load to the emission optical system by the image plane control optical system. Further, since the angle-widening mirror provided to the projection unit reflects and widen the angle of the light forming the image plane (i.e., the image plane sufficiently tilted with respect to the plane perpendicular to the normal line of the optical axis or the optical axis) sufficiently tilted with respect to the display surface or the optical axis, the preferable ultra-short projection with the aberration such as distortion prevented from occurring can be performed without adopting the eccentric optical system. Further, by widening the angle of the light forming the picture due to the reflection by the angle-widening mirror with a concave surface, reduction of the color aberration due to the angle widening becomes also possible. Thus, it is possible to obtain a projector capable of display of the image using the ultra-short projection with a super short distance and display of the image using the middle and long-distance projection.

In a specific aspect of the invention, the projector described above is configured such that the projection unit includes a variable power optical system adapted to vary magnification of the image forming the image plane of the display surface tilted with respect to the display surface. In this case, the image forming the image plane tilted with respect to the display surface can be made to have an appropriate size.

In another specific aspect of the invention, the variable power optical system is a contraction optical system adapted to relatively contract the image forming the image plane of the display surface tilted with respect to the display surface.

Thus, it is possible to contract the image forming the image plane tilted with respect to the display surface to thereby perform the ultra-short projection.

In still another specific aspect of the invention, the projection unit images the image plane of the display surface tilted with respect to the display surface on the irradiated surface parallel to the display surface.

Yet another specific aspect of the invention, the emission optical system can be switched between a normal display state in which an image forming the image plane of the display surface parallel to the display surface is imaged within a first range with a relatively long distance along an optical axis, and a macro display state in which an image forming the image plane of the display surface parallel to the display surface is imaged within a second range with a relatively short distance along the optical axis.

In still yet another specific aspect of the invention, the main body section is detachably attached to the projector. Thus, it is possible to take out the relatively lightweight main body section from the projector to thereby perform the middle and long-distance projection.

In further another specific aspect of the invention, the emission optical system and the projection unit are arranged so as to have respective optical axes aligned with each other. According to this configuration, adjustment of the optical system and processing of the optical element for obtaining the desired optical performance can be made easier. In particular, alignment between the main body section and the projection unit can be made easier.

In still further another specific aspect of the invention, the emission optical system and the projection unit constitute a shift optical system adapted to make the light from the display surface proceed while being shifted from the optical axis. According to this configuration, it is possible to avoid the interference of the light reflected by the angle-widening mirror with the optical element on the optical axis, and to make the light widened in the angle proceed to the irradiated surface.

Another aspect of the invention is directed to a projection unit used in combination with a main body section including a light source, a display surface irradiated with light from the light source, and an emission optical system adapted to emit light from the display surface, and adapted to project the light from the display surface, which is emitted from the emission optical system, toward the irradiated surface, and including an image plane control optical system adapted to change the light emitted from the emission optical system to light forming the image plane of the display surface tilted with respect to the display surface, and an angle-widening mirror with a concave surface having positive power and adapted to reflect light forming an image plane of the display surface tilted with respect to the display surface, and widen the angle of the light. According to this configuration, there can be obtained a projection unit for switching from the display of the image by the middle and long-distance projection to the display of the image by the ultra-short projection with a super short distance.

In a specific aspect of the invention, this projection unit described above is configured such that a variable power optical system adapted to vary magnification of the image forming the image plane of the display surface tilted with respect to the display surface is further provided.

Still another aspect of the invention is directed to an interactive board including the projector according to any one of the aspects described above, and a screen display section including the irradiated surface, and adapted to make it possible to write other information on the irradiated surface, wherein the main body section including the emission optical system out of the projector is detachably attached.

The interactive board displays an image on the screen display section using the ultra-short projection from the projector having the main body section and the projection unit combined with each other. By adopting the configuration for the ultra-short projection, the size in the depth direction can be suppressed to a small size. Further, the main body section including the emission optical system is detachably attached to the interactive board, and by making it possible for the main body section to perform the middle and long-distance projection by itself, a high level of versatility and convenience can be assured. By applying the projector for enlarged projection, it becomes possible for the interactive board to reduce the weight, the power consumption, and the cost. Thus, there can be obtained the interactive board capable of reducing the weight, the power consumption, and the cost, and suppressing the depth size, and thus having a high level of convenience.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be described in detail with reference to the accompanying drawings.

First Embodiment

Figure 1:
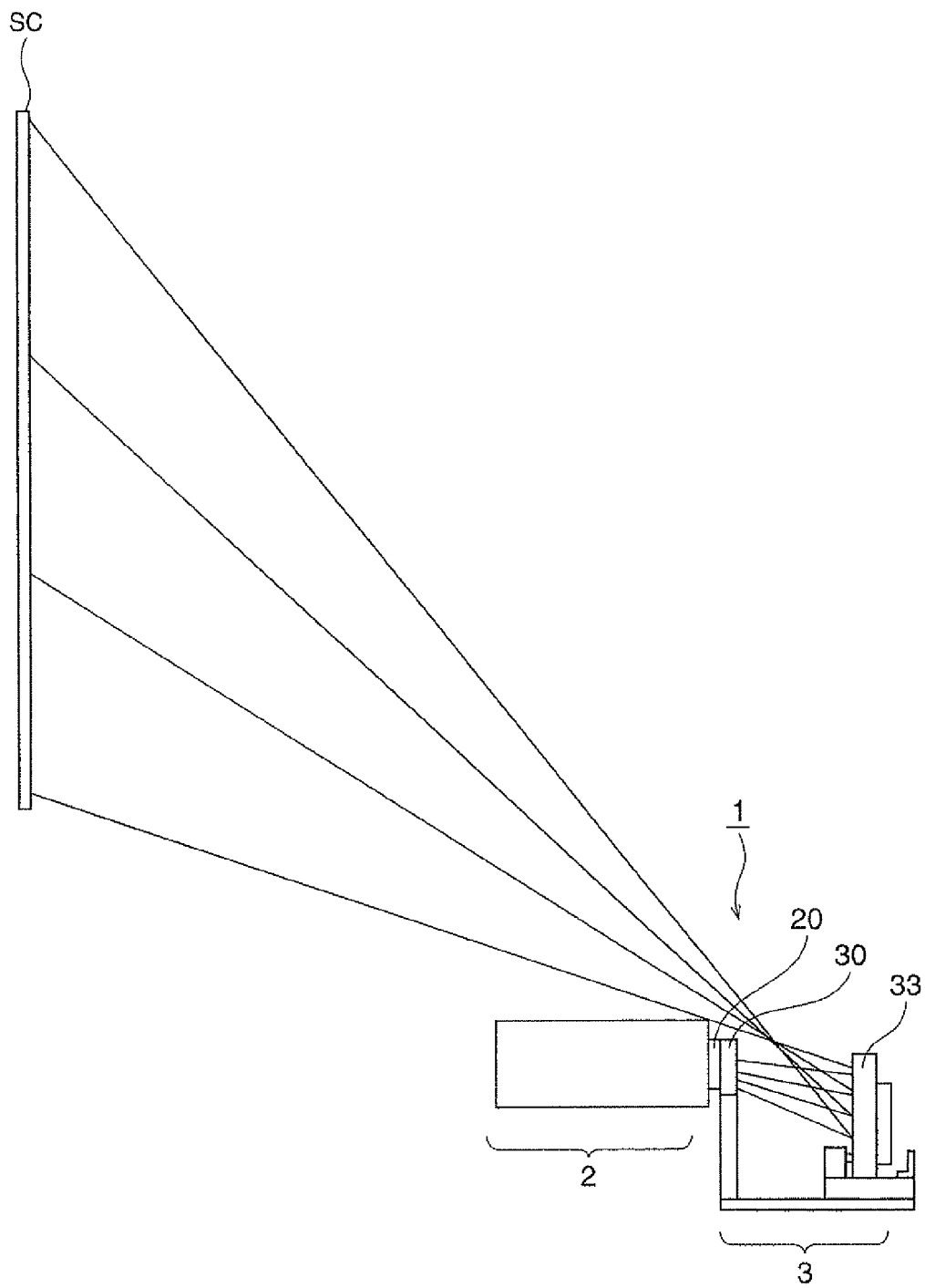
FIG. 1 is a diagram showing a schematic configuration of a projector according to a first embodiment of the invention.

FIG. 1 is a diagram showing a schematic configuration of a projector 1 according to a first embodiment of the invention. The projector 1 has a main body section 2 and a projection unit 3. The main body section 2 emits the picture light corresponding to the image signal. The projection unit 3 projects the picture light from the main body section 2 toward an irradiated surface of a screen SC.

Figure 2:
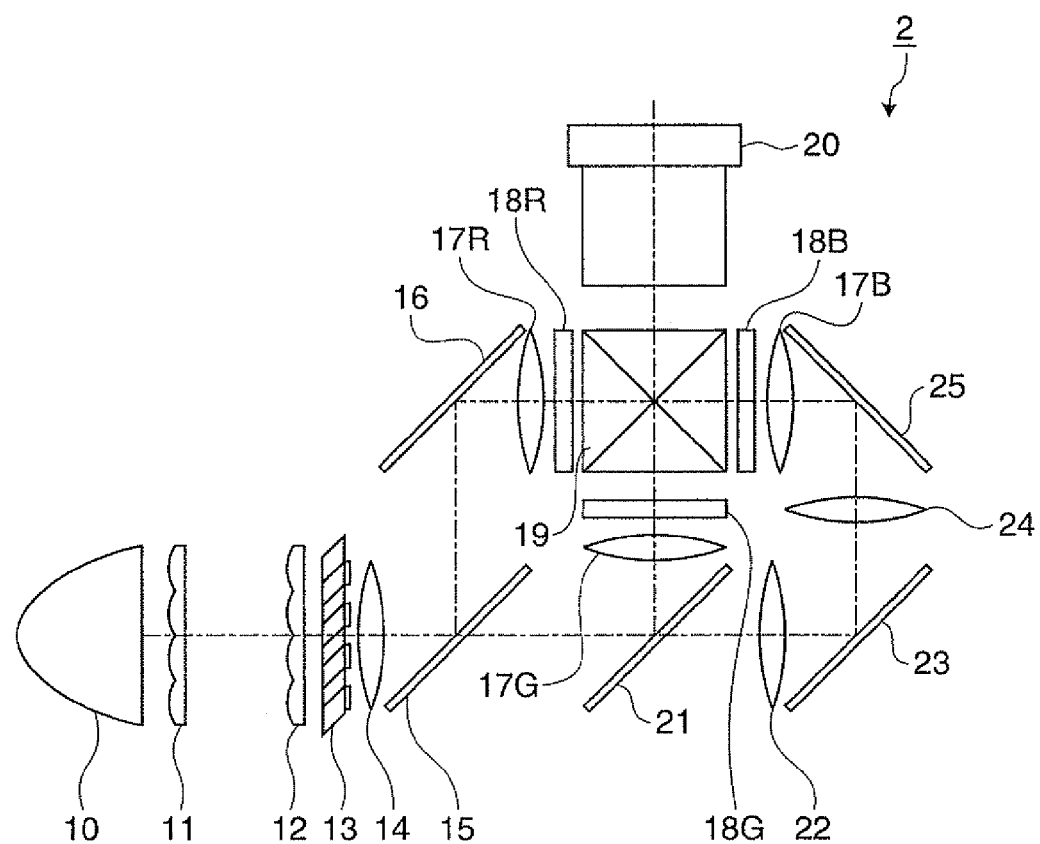
FIG. 2 is a diagram showing a schematic configuration of a main body section.

FIG. 2 is a diagram showing a schematic configuration of the main body section 2. A light source 10 is, for example, a super-high pressure mercury lamp, and emits light including R light, G light, and B light. Here, the light source 10 can be a discharge light source other than the super-high pressure mercury lamp, or can be a solid-state light source such as an LED or a laser. A first integrator lens 11 and a second integrator lens 12 each have a plurality of lens elements arranged in an array. The first integrator lens 11 divides a light beam from the light source 10 into a plurality of light beams. Each of the lens elements of the first integrator lens 11 focuses the light beam from the light source 10 in the vicinity of the corresponding one of the lens elements of the second integrator lens 12. The lens elements of the second integrator lens 12 and an overlapping lens 14 form the images of the respective lens elements of the first integrator lens on liquid crystal display panels 18R, 18G, and 18B. According to such a configuration, the light from the light source 10 illuminates the whole of the desired area (an image display surface) of each of the liquid crystal display panels 18R, 18G, and 18B with even luminance.

A polarization conversion element 13 converts the light from the second integrator lens 12 into predetermined linearly polarized light. The overlapping lens 14 overlaps the images of the respective lens elements of the first integrator lens 11 on the irradiated surfaces of the respective liquid crystal display panels 18R, 18G, and 18B.

A first dichroic mirror 15 reflects the R light input from the overlapping lens 14, and transmits the G light and the B light. The R light reflected by the first dichroic mirror 15 enters the liquid crystal display panel 18R as a spatial light modulation device via a reflecting mirror 16 and a field lens 17R. The liquid crystal display panel 18R modulates the R light in accordance with the image signal.

The second dichroic mirror 21 reflects the G light from the first dichroic mirror 15, and transmits the B light. The G light reflected by the second dichroic mirror 21 enters the liquid crystal display panel 18G as a spatial light modulation device via a field lens 17G. The liquid crystal display panel 18G modulates the G light in accordance with the image signal. The B light transmitted through the second dichroic mirror 21 enters the liquid crystal display panel 18B as a spatial light modulation device via relay lenses 22, 24, reflecting mirrors 23, 25, and a field lens 17B. The liquid crystal display panel 18B modulates the B light in accordance with the image signal.

A cross dichroic prism 19 as a color combining optical system combines the lights modulated by the respective liquid crystal display panels 18R, 18G, and 18B to form the picture light, and makes it proceed to a projection lens 20. The projection lens 20 functions as an emission optical system for emitting the picture light from the main body section 2. It should be noted that it is also possible to adopt reflective liquid crystal display panels as the spatial light modulation devices instead of the transmissive liquid crystal display panels 18R, 18G, and 18B. Further, as the spatial light modulation devices, reflective devices (e.g., a micromirror device) can also be adopted.

Figure 3A:
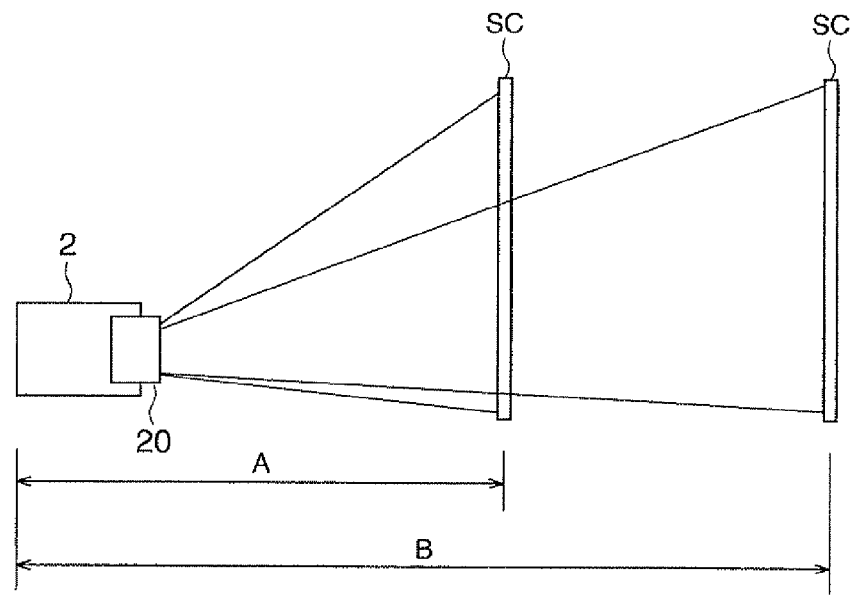
FIG. 3A is a schematic diagram for explaining projection by the main body section alone.

FIG. 3A is a schematic diagram for explaining the projection distance in the case of projecting the picture light with the main body section 2 alone. The main body section 2 is arranged to be detachably attached to the projector 1. The main body section 2 as a unit detached from the projector 1 displays the picture on the irradiated surface using the picture light projected from the projection lens 20. In this case, the main body section 2 is installed with the projection lens 20 facing to the screen SC. It is assumed that the main body section 2 is capable of adjusting the focus in a range of distance from A to B (assuming A<B) with, for example, the same screen size.

Figure 3B:
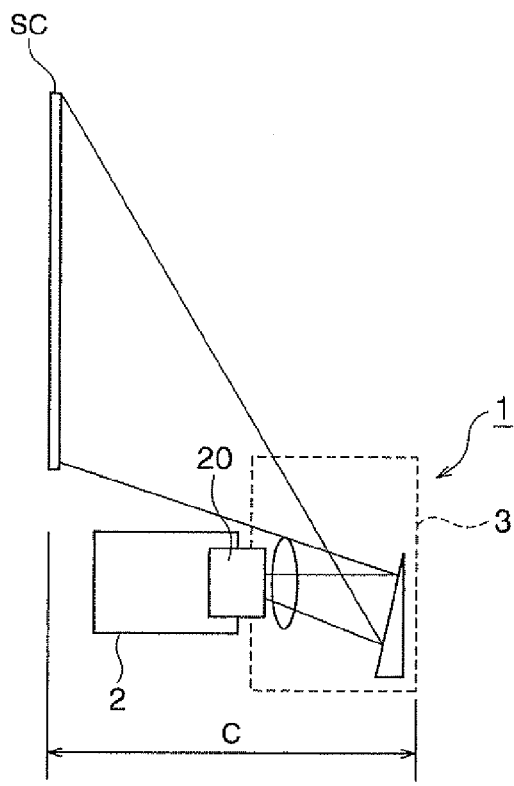
FIG. 3B is a schematic diagram for explaining projection in the case of combining a projection unit to the main body section.

FIG. 3B is a schematic diagram for explaining the projection distance in the case of projecting the picture light with the projection unit 3 combined with the main body section 2. The projector 1 makes the projection unit 3 project the picture light emitted from the projection lens 20 to thereby display the picture on the irradiated surface. On this occasion, the main body section 2 is attached to the projector 1 with the projection lens 20 facing to the projection unit 3 on the opposite side to the screen SC. The projector 1 becomes capable of projection with a distance C shorter than the distance A.

Figure 4:
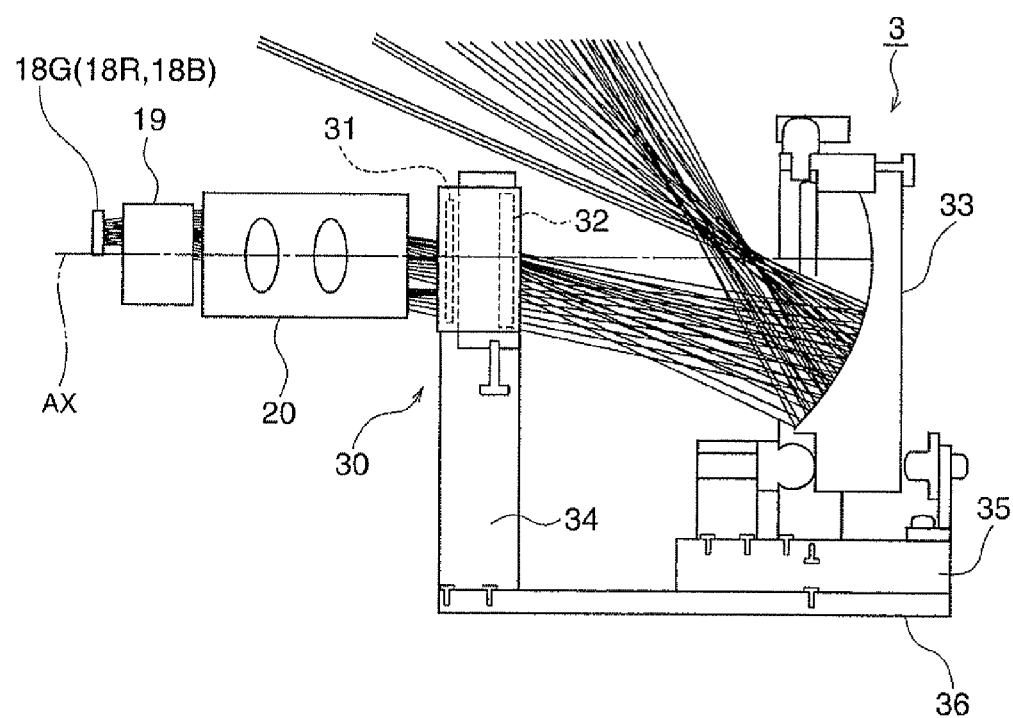
FIG. 4 is a diagram showing a cross-sectional configuration of the projection unit and rays of picture light.

FIG. 4 is a diagram for illustrating a cross-sectional configuration of the projection unit 3, and the rays of the picture light before and after entering the projection unit 3. The projection unit 3 is provided with a first lens 31, a second lens 32, and a angle-widening mirror 33 as optical elements. The first lens 31 and the second lens 32 are disposed at the positions opposed to the projection lens 20. Each of the first lens 31 and the second lens 32 can be formed of, for example, a spherical lens. The first lens 31 and the second lens 32 are supported on a substrate 36 with a lens support section 34.

The angle-widening mirror 33 is disposed at a position where the picture light from the first lens 31 and the second lens 32 enters. The angle-widening mirror 33 is a concave aspheric mirror for reflecting the picture light to thereby make it wide-angle. The angle-widening mirror 33 is supported by the mirror support section 35 on the substrate 36. The first lens 31, the second lens 32, and the angle-widening mirror 33 are positioned via the substrate 36 common thereto, and are fixed.

The angle-widening mirror 33 has a shape of roughly rotational symmetry about the center axis (the optical axis), for example, an aspheric shape obtained by cutting out a part of a cone shape. The axis of symmetry or the optical axis of the angle-widening mirror 33 coincides with the optical axis AX of the projection lens 20. The optical axes of the first lens 31 and the second lens 32 also coincide with the optical axis AX of the projection lens 20. As described above, the projection lens 20, the first lens 31, the second lens 32, and the angle-widening mirror 33 are disposed so that the optical axes AX coincide with each other.

The projection lens 20, the first lens 31, the second lens 32, and the angle-widening mirror 33 make the light modulated in accordance with the image signal proceed while being shifted toward a specific side. Specifically, in the image side, the light is made to proceed while being shifted toward the vertically downside as the specific side with respect to the optical axis AX. The center normal line (equal to the center normal line of the image display surface area of the display surface DS described later) of the image plane virtually formed in the entrance surface of the cross dichroic prism 19 is parallel to the optical axis AX, and is located on the vertically upside which is the opposite side to the specific side with respect to the optical axis AX.

It should be noted that when explaining the projection lens 20 and the projection unit 3, the object side denotes the side of the liquid crystal display panel 18G (18R, 18B), and the image side denotes the side of the image plane IMG or the side of the screen SC.

The main body section 2 is arranged to, for example, have a structure completely separated from the projection unit 3, and to be detachably attached to the projector 1. Further, it is also possible to arrange that the main body section 2 is moved within the projector 1, and is configured integrally with the projection unit 3. In the case of, for example, the middle and long-distance projection, it is also possible to adopt a configuration of moving the main body section 2 to the position where the picture light projected from the projection lens 20 is not blocked by the projection unit 3. In the case of configuring the main body section 2 and the projection unit 3 integrally with each other, for the reason that, for example, the position adjustment between the both members after carrying the projector 1 can be eliminated, it becomes possible to enhance the convenience of the user. It is obvious that it is also possible to fix the main body section 2, and arrange that the projection unit 3 can move to the position where the picture light projected from the projection lens 20 is not blocked by the projection unit 3.

Figure 5:
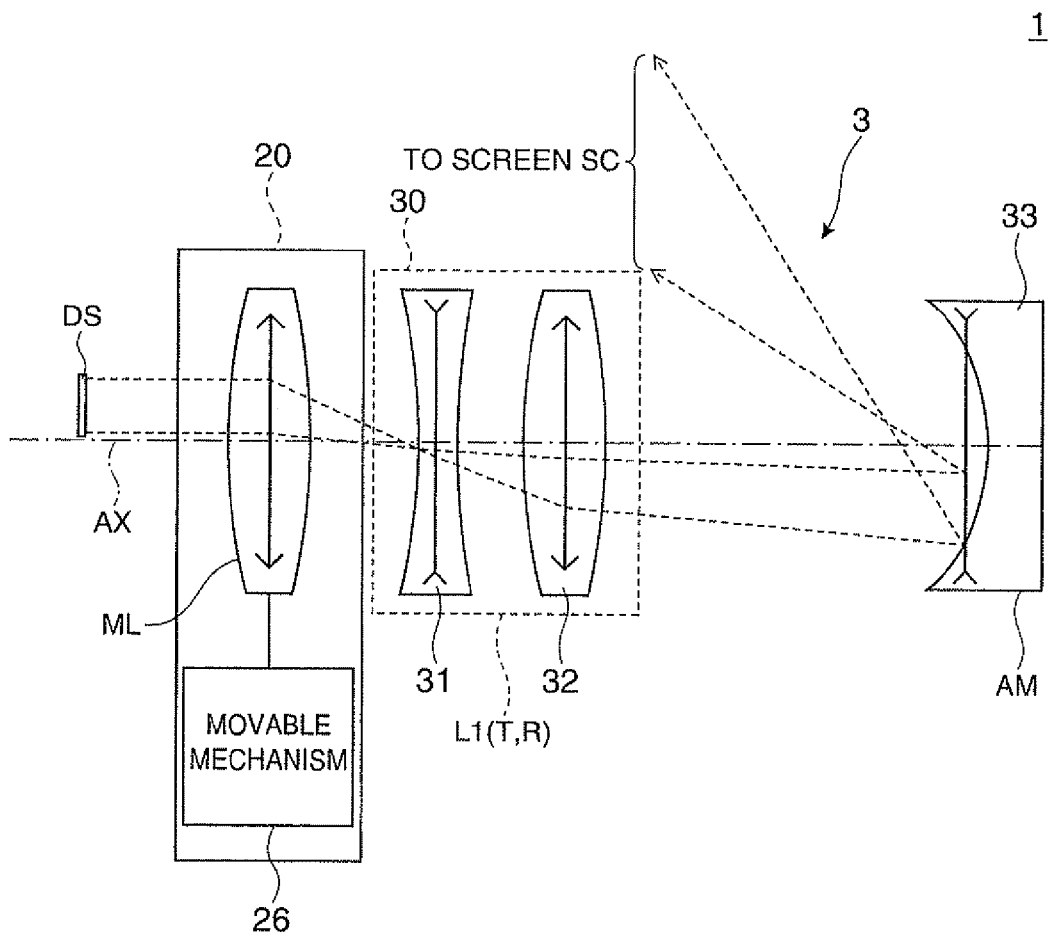
FIG. 5 is a schematic diagram for explaining functions of the respective optical elements shown in FIG. 4.

FIG. 5 is a schematic diagram conceptually showing the optical elements constituting the projection optical system of the projector 1. The projection lens 20 is provided with a master lens ML for enlarged projection, and makes the middle and long-distance projection shown in FIG. 3A possible by itself. The projection unit 3 makes it possible to perform the ultra-short projection with a super short distance to the screen SC not shown disposed above and behind the projection lens 20 in combination with the projection lens 20. Here, the projection unit 3 can be considered while being divided into an adjusting lens L1 corresponding to a refracting optical system 30 and disposed on the master lens ML side, and an aspheric mirror AM corresponding to the angle-widening mirror 33 and located on the screen SC side.

The master lens ML is attached with a movable mechanism 26, and it is arranged that the position of the master lens ML in the optical axis AX can relatively be changed manually or automatically when attaching or detaching the projection unit 3. The adjusting lens L1 in the anterior stage of the projection unit 3 has positive power as a whole, and is provided with the first lens 31 with negative power disposed on the master lens ML side or the light entrance side, and the second lens 32 with positive power disposed on the light exit side. It should be noted that the adjusting lens L1 functions as a image plane tilting optical system T as an image plane control optical system for providing tilt to the image plane formed by the master lens ML, and at the same time, functions as a contraction optical system R for contracting the intermediate image forming the image plane formed by the master lens ML. The aspheric mirror AM has a role of re-imaging the intermediate image, which is formed on the light exit side of the refracting optical system 30, on the screen SC not shown.

In the above configuration, the projection unit 3 is obtained by combining the adjusting lens L1 having relatively weak positive power as a whole, and the aspheric mirror AM having relatively strong positive power with each other, and functions like a Keplerian afocal system to thereby shorten the focal distance and increase the magnification ratio of the image. In other words, the projection unit 3 forms a front converter (on this occasion, a wide converter for angle-widening) with respect to the maser lens ML or the projection lens 20. Here, if it is attempted to constitute the projection unit 3 as the front converter only with the lenses, it becomes difficult to suppress the chromatic aberration, and in the case of attempting to realize the angle-widening not narrower than 130 degrees, occurrence of the chromatic aberration becomes marked. Therefore, it is arranged to constitute the part of the projection unit 3 having strong power by the aspheric mirror AM to thereby prevent the chromatic aberration from occurring. In the case of using such an aspheric mirror AM, since it results that the light is folded by reflection, it is necessary to avoid the interference of the rays in the vicinity of the optical axis AX. Therefore, the display surface DS as the object is shifted from the optical axis AX to thereby arrange the master lens ML, the adjusting lens L1, and the aspheric mirror AM as a shift optical system. It should be noted that the display surface DS corresponds to the image display surface on which the image corresponding to the image signal is formed in each of the liquid crystal display panels 18R, 18G, and 18B of the main body section 2 shown in FIG. 2. Further, in the shift optical system described above, the tendency for the peripheral portion apart from the optical axis AX of each of the optical elements constituting the projection unit 3 to be used is increased, and it results that the screen SC also gets significantly away from the optical axis AX. Therefore, by forming one or more optical element (specifically the aspheric mirror AM) constituting the projection unit 3 and so on so as to have an aspheric surface, the aberration at the position significantly away from the optical axis AX is reduced dramatically.

Figure 6:
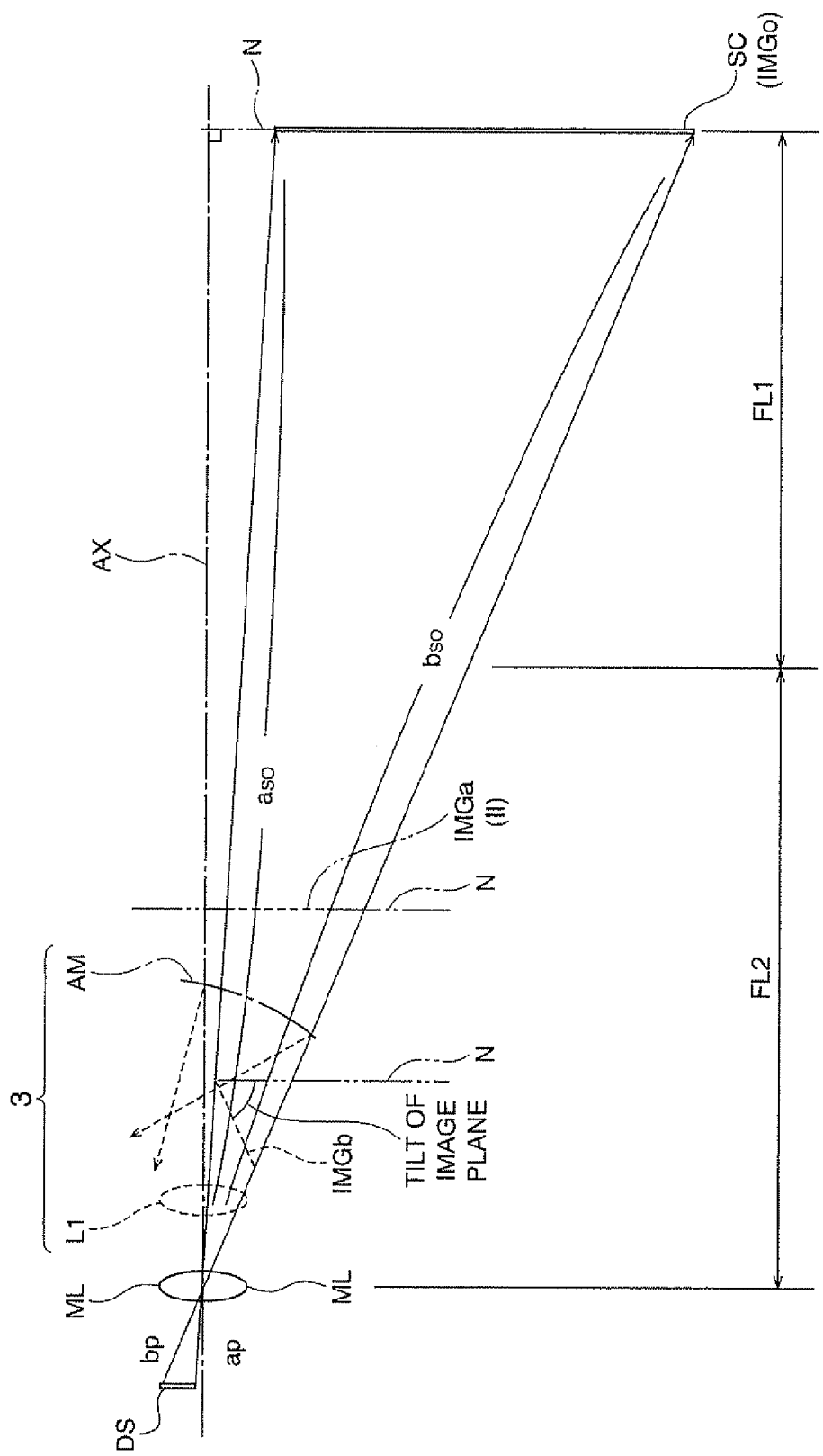
FIG. 6 is a diagram for explaining a relationship between the image height and the ray distance in middle and long-distance projection.

FIG. 6 is a diagram for explaining a relationship between the image height and the ray distance in middle and long-distance projection performed by the master lens ML alone. The image height denotes the height of the image in the vertical direction with reference to the optical axis AX. In the case of the typical middle and long-distance projection performed by the master lens ML alone, the magnification ratio as0/ap in a part with the smallest image height and the magnification ratio bs0/bp in a part with the largest image height take values close to each other, and the image plane IMG0 becomes roughly perpendicular (roughly parallel to the display surface DS) to the optical axis AX.

Figure 7:
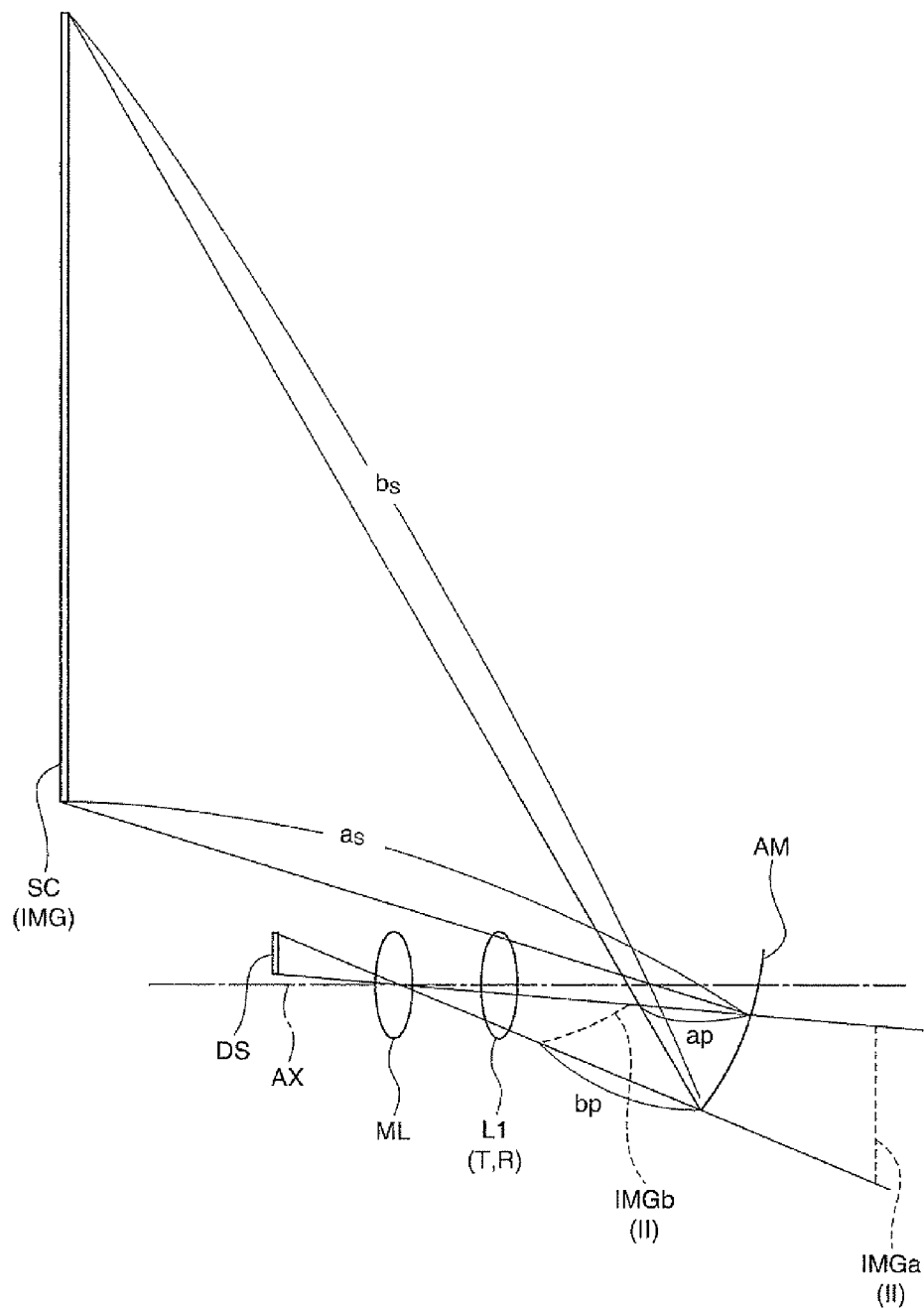
FIG. 7 is a diagram for explaining the case of ultra-short projection.

FIG. 7 is a diagram for explaining the case of the ultra-short projection with a super short distance by the master lens ML added with the projection unit 3. In the case of the ultra-short projection with a super short distance, an intermediate image II of the display surface DS is formed on the image plane IMGb set between the adjusting lens L1 and the aspheric mirror AM by the master lens ML and so on. In order to form the intermediate image II at such a position, firstly, the movable mechanism 26 is made to appropriately shift the master lens ML along the optical axis AX direction to thereby set the image plane IMGa shifted to a position closer to the aspheric mirror AM than the original image plane IMG0 although the details will be explained later. Further, the projection unit 3 is disposed to thereby set the image plane IMGa formed by the master lens ML alone to the state of being tilted with respect to the normal line N of the optical axis AX due to the function of the adjusting lens L1 as the image plane tilting optical system T, and at the same time, contract the intermediate image II formed by the master lens ML alone while keeping the state of being tilted with respect to the normal line N due to the function of the adjusting lens L1 as the contraction optical system R. As a result, the image planes IMG0, IMGa formed by the master lens ML alone change to the image plane IMGb disposed tilting toward the image side of the aspheric mirror AM. It should be noted that if the intermediate image II can be formed on the image plane IMGb on the image side of the aspheric mirror AM by the shift of the master lens ML, it becomes unnecessary to provide the adjusting lens L1 with the function as the contraction optical system R.

In the configuration described above, the master lens ML performs the middle and long-distance projection by itself using a first range FL1. Further, the master lens ML becomes in the sate of forming the intermediate image II in the image plane IMGb in cooperation with the adjusting lens L1 in order to perform the ultra-short projection with a super short-distance in a second range FL2 located on the master lens ML side of the first range FL1.

The intermediate image II formed on the image plane IMGb located in front of the aspheric mirror AM is re-imaged on the screen SC in an enlarged manner by the aspheric mirror AM. On this occasion, the magnification as/ap of the portion with the minimum image height and the magnification bs/bp of the portion with the maximum image height are required to have values close to each other. Although the reason therefor is to make the magnification of the image even irrespective of the image height to thereby eliminate the distortion in the image on the screen SC, it is required to significantly tilt the image plane IMGb of the intermediate image II with respect to the normal line N of the optical axis AX in order to achieve this. From a different point of view, the aspheric mirror AM reflects the picture light to thereby play a role of erecting or inverting the image plane IMGb perpendicularly (in parallel to the display surface DS) to the optical axis AX. By erecting or inverting the image plane IMGb in parallel to the display surface DS with the aspheric mirror AM, it is possible to appropriately project the image of the display surface DS in the irradiated surface of the screen SC parallel to the display surface DS.

The aspheric mirror AM includes an aspheric shape expressed by the following polynomial h. Here, it is assumed that "y" denotes the height (the image height) of the image from the optical axis AX, "c" denotes the curvature of the spherical surface used as a reference of the shape of the aspheric mirror AM, "k" denotes the conic constant, A2, A4, A6, A8, A10, . . . respectively denote predetermined correction terms.

$$h = \frac{cy^2}{1+\sqrt{1-(1+k)c^2 y^2}} + A_2 y^2 + A_4 y^4 + A_6 y^6 + A_8 y^8 + A_{10} y^{10} + \ldots$$

The fractional term of the polynomial is a term for representing the aspheric shape to be the reference, and represents a spherical shape in the case of k=0. The correction terms represent the shift from the reference aspheric shape. The polynomial described above expresses an aspheric shape rotationally symmetric about the center axis even if the reference aspheric shape is corrected by the correction terms. It should be noted that it is assumed that the number of correction terms in the polynomial h is arbitrary.

If the picture light is made wide-angle, since generally, the further the periphery is located from the optical axis AX, the more easy it becomes for the aberration such as distortion to occur, the design for dramatically reducing the aberration in the periphery is particularly required. In the present embodiment, since the correction terms are included in the polynomial h expressing the shape of the aspheric mirror AM, it becomes possible to perform the correction of the shape corresponding to the height y from the optical axis AX on a quadratic curve defined by c and k. Since a power of y is multiplied in each of the correction terms, it results that the greater the value of y in the portion is, the more effectively the portion is corrected. Therefore, even if the master lens ML is made short-focus using the projection unit 3 including the aspheric mirror AM and so on, it becomes possible to realize a high-performance optical system having extremely small aberration such as distortion in the periphery. It should be noted that the formula expressing the shape of the aspheric mirror AM is not limited to what is explained in the present embodiment, but can arbitrarily be modified. Further, the shape of the angle-widening mirror 33 can be a free-form surface expressed by an XY polynomial.

Figure 8:
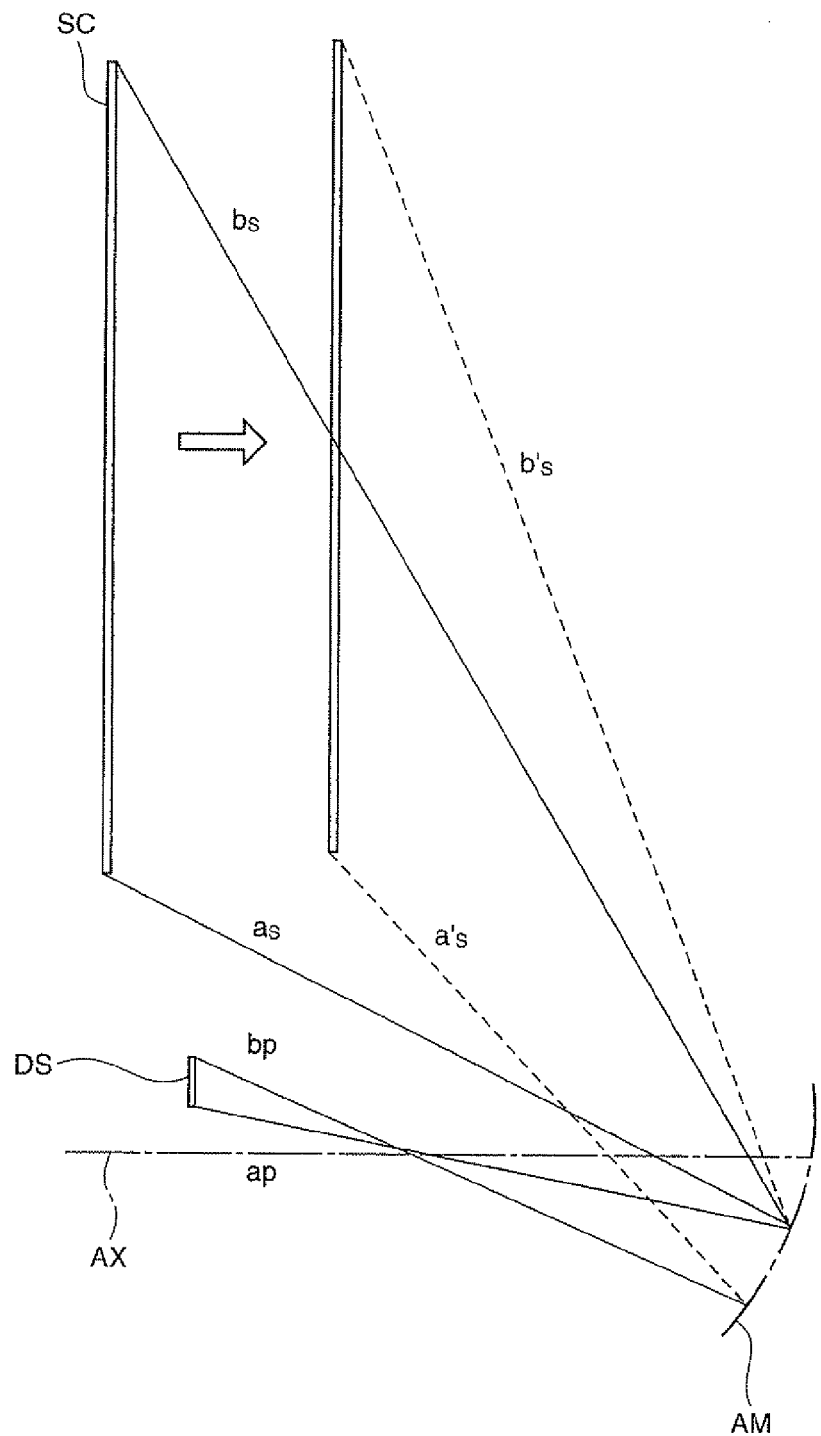
FIG. 8 is a diagram for explaining reduction of the distance and the variation in the ray distance.

As shown in FIG. 8, as the screen SC and the aspheric mirror AM are made closer to each other, the distance of the rays changes from bs to bs' in the portion with the maximum image height. Regarding the portion with the large image height, by adjusting the polynomial expressing the shape of the aspheric mirror AM so as to vary the distance of the rays as described above, the effective correction becomes possible. If the reduction of distance is made to proceed, it becomes necessary to perform the correction of changing the distance of the rays from as to as' not only on the portion with a large image height but also on the portion with a small image height. The smaller the image height of the portion is, the more difficult it becomes to perform the correction using the polynomial of the aspheric mirror AM described above on the portion. Therefore, in the present embodiment, it is assumed that the aberration correction is performed on the portion with a small image height using the optical characteristics of the master lens ML instead of the aberration correction by the aspheric mirror AM.

Figure 9A:
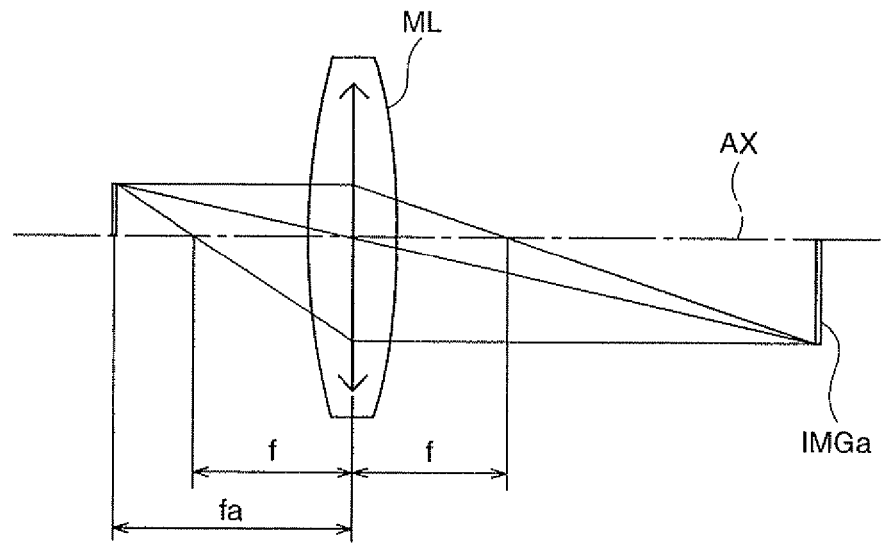
FIGS. 9A and 9B are diagrams for explaining a method of achieving contraction of an image plane using a master lens.
Figure 9B:
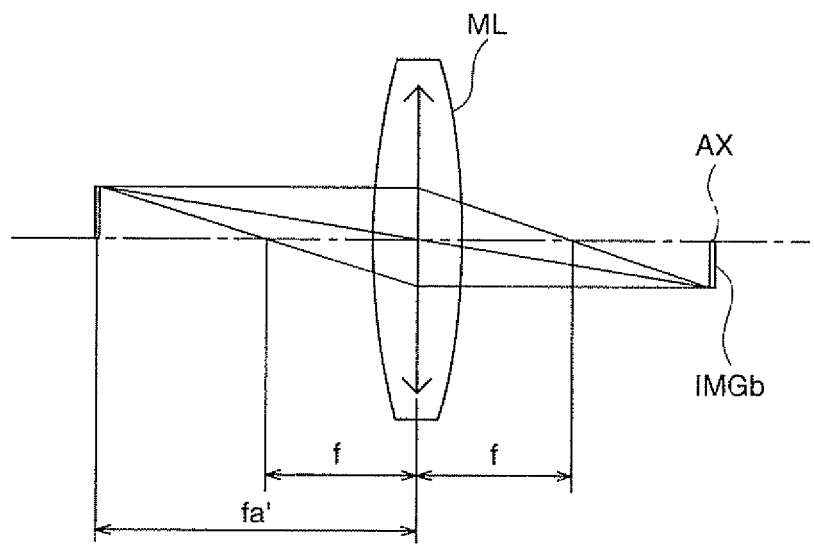

FIGS. 9A and 9B are diagrams for explaining a purpose of shifting the master lens ML along the direction of the optical axis AX. FIG. 9A shows the case (a first mode) of the middle and long-distance projection setting the back focus to fa. The first mode is a mode for displaying an image on the irradiated surface by the main body section 2, namely the master lens ML alone, and corresponds to a normal display state. FIG. 9B shows the case (a second mode) of the ultra-short projection with a super short distance setting the back focus to fa' (fa<fa'). The second mode is a mode for displaying an image on the irradiated surface by the combination of the main body section 2 and the projection unit 3, and corresponds to a macro display state.

In the second mode (the macro display state), the master lens ML is shifted toward the image side along the direction of the optical axis AX using the movable mechanism 26 shown in FIG. 5 so that the back focus is elongated with respect to the normal position of the master lens ML in the first mode (the normal display state). Thus, the image plane comes closer, and at the same time, the image is contracted. Specifically, the image plane IMGa having been distant from the master lens ML is shifted to the image plane IMGb closer to the master lens ML, and the image forming the image plane IMGb corresponds to what is obtained by contracting the image forming the image plane IMGa. Thus, the load of forming the intermediate image II contracted and tilted by the projection unit 3 is reduced in the ultra-short projection in combination with the projection unit 3. As a result, in the case of combining the main body section 2 provided with the master lens ML to the projection unit 3 provided with the aspheric mirror AM and so on, a high optical performance can be exerted.

The master lens ML described above can be set to a typical magnifying projection lens. Further, when changing the mode, a simple operation of only shifting the master lens ML inside the main body section 2 in the optical axis AX direction can be adopted, and thus, the simple and accurate configuration can be realized with little increase in cost. It should be noted that in the second mode as already explained, the image plane IMGa by the master lens ML is tilted with respect to the display surface DS or the plane perpendicular to the optical axis AX and contracted by the adjusting lens L1 (the image plane tilting optical system T, the contraction optical system R) to thereby be converted into the image plane IMGb appropriately set in front of the aspheric mirror AM. By being reflected by the aspheric mirror AM, the picture light from the contracted intermediate image II forming the image plane IMGb tilted and contracted as described above is erected or inverted in roughly parallel to the display plane DS and is then imaged on the screen SC roughly perpendicular to the optical axis AX (see FIG. 7).

Hereinafter, the functions of the projection unit 3 and the projection lens 20 constituting the projector 1 will be explained in detail with reference to FIG. 5 and so on. Although the projection lens 20 is a typical magnifying projection lens, the image quality in the ultra-short projection can be improved by providing a function of correcting the aberration in the portion with small image height. The projection unit 3, namely the first lens 31, the second lens 32, and the angle-widening mirror 33, functions as a front converter for magnifying the image.

It should be noted that since in the present embodiment, the shift optical system is adopted as the projection unit 3 functioning as the front converter, it results that the focal position is slightly shifted when performing projection on the screen SC. With respect to the various aberrations caused therefrom, it is possible to take measures of the correction by the angle-widening mirror 33 or using a lens for reducing the aberrations together therewith. Further, it is also possible for the first lens 31 and the second lens 32 constituting the refracting optical system 30 to be provided with a function of correcting the aberrations by adopting the aspheric lens instead of the spherical lens. By thus combining a plurality of optical elements provided with the aberration correction function, it becomes possible to fulfill the high-performance optical specifications. In particular, by adopting an aspheric lens or a free-form surface lens instead of the spherical lens in the lens group constituting the refracting optical system 30, it is also possible to reduce the number of lenses or to miniaturize the lenses. Thus, the cost reduction and the miniaturization of the mirror frame becomes possible.

The first lens 31 as an optical element with negative power and the second lens 32 as an optical element with positive power function not only as the image plane tilting optical system T for tilting the image plane IMGa formed by the projection lens 20, but also as the contraction optical system R for contracting the image plane IMGa in an area between the projection lens 20 and the angle-widening mirror 33. Here, the contraction optical system R composed mainly of the first lens 31 and the second lens 32 functions as a variable power optical system for varying the magnification for the image forming the image plane IMGa tilted with respect to the normal line N of the optical axis AX.

The angle-widening mirror 33 corresponding to the aspheric mirror AM folds the picture light so that the image plane IMGb (see FIG. 7) tilted by the image plane tilting optical system T and contracted by the contraction optical system R becomes roughly parallel to the irradiated surface of the screen SC, and then projects it in an enlarged manner. Further, the angle-widening mirror 33 has a function of correcting the aberration particularly in the portion with large image height.

The angle-widening mirror 33 is formed to have a shape roughly rotationally symmetric about the center axis to thereby make it easy to align the optical axis AX with other constituents (the projection lens 20 and the refracting optical system 30). Further, the angle-widening mirror 33 can be worked using a lathe or the like, and can therefore be manufactured easily with high accuracy. By adopting a coaxial optical system, it is possible for the projector 1 to adopt a normal design approach for the coaxial system. Therefore, it is possible to reduce the design manpower of the optical system and to realize an optical system with reduced aberration.

Since the present embodiment adopts the configuration of disposing a plurality of optical elements along the optical axis AX at predetermined intervals, assembling can be made easy by aligning the optical axis AX, and it becomes also possible to realize a high performance. In particular, when attaching or detaching the main body section 2, it results that a highly accurate alignment between the projection lens 20 of the main body section 2 and each of the optical elements of the projection unit 3 is required. By making the optical axis AX common, it is possible to make it easy to perform the alignment between the optical elements on the main body section 2 side and the optical elements on the projection unit 3 side. In the case of the coaxial optical system, the variation in the optical performance from the optical axis toward the periphery can be made gentle compared to the variation in the optical performance in the eccentric optical system. Therefore, since it becomes possible to provide a certain level of margin to the alignment accuracy, it becomes possible to realize a configuration suitable to the invention.

According to the above, it becomes possible to realize the ultra-short projection with a super short distance and the middle and long-distance projection by the single projector 1 without deteriorating the quality of the image. The single projector 1 can cover the wide projection distance ranging from a super short distance to a middle and long distance.

First Specific Example

Figure 10:
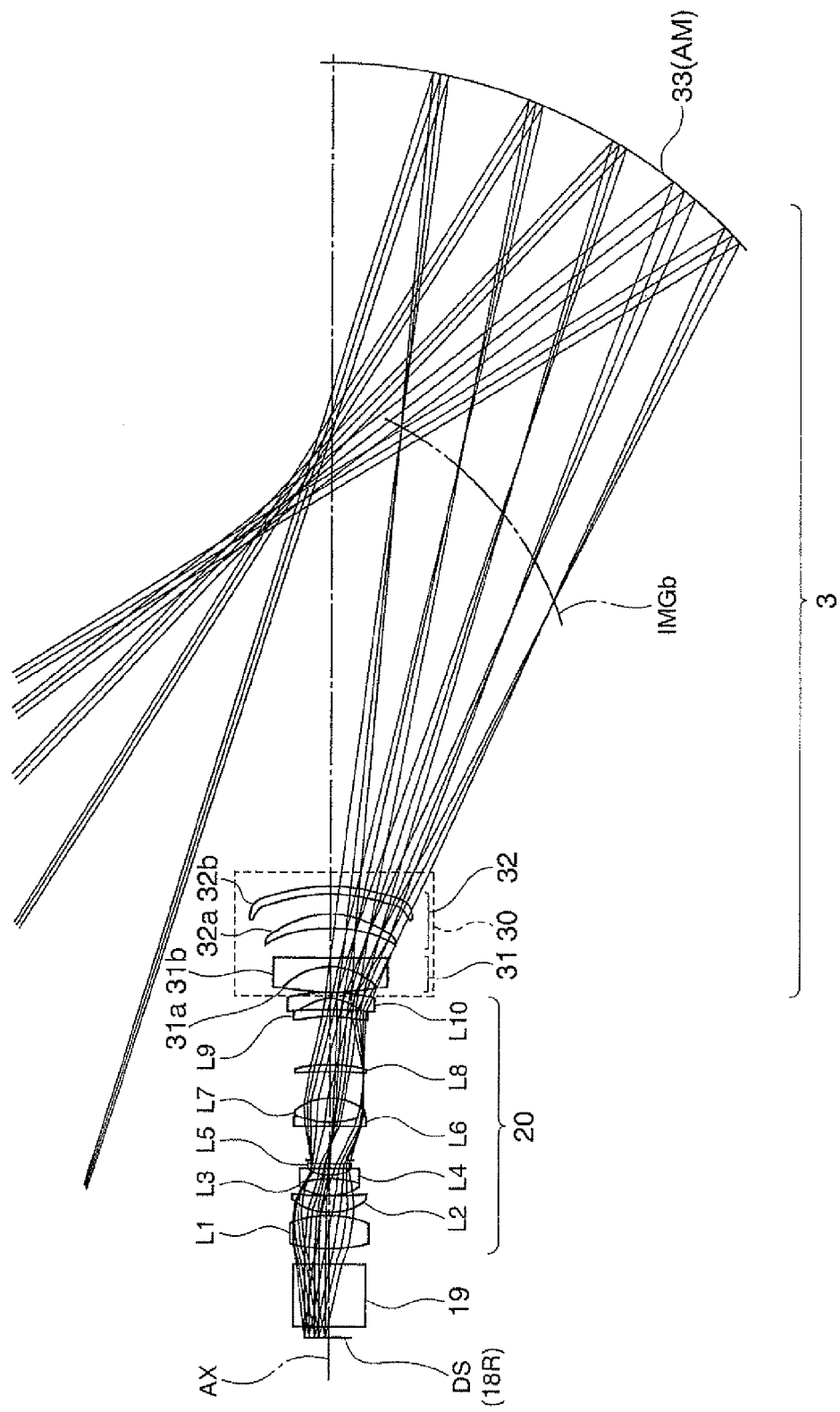
FIG. 10 is a diagram for explaining the optical system of a first specific example of the first embodiment.

FIG. 10 is a diagram for explaining a first specific example of the ultra-short projection by the combination of the projection lens 20 in the second mode and the projection unit 3. Here, the projection lens 20 is represented by lenses L01 through L10, and the projection unit 3 has the first and second lenses 31, 32, and the angle-widening mirror 33. Among these lenses, the first lens 31 includes two lenses 31a, 31b, and the second lenses 32 includes two lenses 32a, 32b.

Table 1 below shows lens data and so on of the first specific example. In Table 1, "SURFACE NUMBER" denotes the number assigned to each of the surfaces of the lenses sequentially from the display surface DS side. Further, "SURFACE TYPE" indicates whether the surface is spherical or aspheric, or the fact that the surface is a reflecting surface, "R (Y CURVATURE RADIUS)" represents the curvature radius of the surface, and "D (SURFACE INTERVAL)" represents the lens thickness or the air space from the subsequent surface. Further, "Nd" represents the refractive index in the d-line of the lens material, and "vd" represents the dispersion of the lens material.

TABLE 1

| SURFACE NUMBER | SURFACE TYPE | R (Y CURVATURE RADIUS) | D (SURFACE INTERVAL) | Nd | vd |
| --- | --- | --- | --- | --- | --- |
| OBJECT | SPHERICAL | INFINITE | 5.0764 | | |
| 1 | SPHERICAL | INFINITE | 25.7500 | 1.516800 | 64.2 |
| 2 | SPHERICAL | INFINITE | 6.0000 | | |
| 3 | SPHERICAL | 66.3865 | 13.0000 | 1.589130 | 61.2 |
| 4 | SPHERICAL | −44.9576 | 1.0000 | | |
| 5 | SPHERICAL | 23.7593 | 6.8760 | 1.696800 | 55.4 |
| 6 | SPHERICAL | 353.5733 | 0.2000 | | |
| 7 | SPHERICAL | 24.4982 | 6.3000 | 1.487490 | 70.4 |
| 8 | SPHERICAL | −47.8751 | 1.3000 | 1.805180 | 25.4 |
| 9 | SPHERICAL | 17.8409 | 2.4710 | | |
| 10 | SPHERICAL | −966.0303 | 1.4000 | 1.834000 | 37.3 |
| 11 | ASPHERIC | 41.9320 | 2.0000 | | |
| APERTURE SURFACE | SPHERICAL | INFINITE | 13.4250 | | |
| 13 | SPHERICAL | 1815.1494 | 1.3000 | 1.806100 | 33.2 |
| 14 | SPHERICAL | 38.4700 | 9.5000 | 1.744000 | 44.9 |
| 15 | SPHERICAL | −26.1410 | 10.4790 | | |
| 16 | SPHERICAL | −243.3240 | 2.4000 | 1.805180 | 25.4 |
| 17 | SPHERICAL | −75.7335 | 19.4530 | | |
| 18 | ASPHERIC | −34.3375 | 2.2000 | 1.531160 | 56.0 |
| 19 | ASPHERIC | −81.4882 | 4.3918 | | |
| 20 | SPHERICAL | −20.3540 | 1.8000 | 1.696800 | 55.4 |
| 21 | SPHERICAL | −125.9050 | 0.1000 | | |
| 22 | SPHERICAL | 140.6379 | 9.8846 | 1.523609 | 54.0 |
| 23 | SPHERICAL | −27.7107 | 3.0000 | 1.743972 | 44.8 |
| 24 | SPHERICAL | −797.2825 | 11.4114 | | |
| 25 | ASPHERIC | −86.1911 | 4.7047 | 1.492000 | 57.2 |
| 26 | ASPHERIC | −40.4342 | 9.2839 | | |
| 27 | ASPHERIC | −44.6690 | 2.0000 | 1.492000 | 57.2 |
| 28 | ASPHERIC | −73.3630 | 316.3689 | | |
| 29 | ASPHERIC | −196.6430 | −900.0000 | | |
| IMAGE | SPHERICAL | INFINITE | 0.0000 | | |

In the first specific example, although the projection lens 20 and the projection unit 3 are basically formed of spherical surfaces, the exit surface of the fifth lens L05, the entrance and exit surfaces of the ninth lens L09, the entrance and exit surfaces of the lenses 32a, 32b included in the second lens 32, and the angle-widening mirror 33 are each formed of an aspheric surface. The displacement of the aspheric shape from the surface apex in the optical axis AX direction is provided as the polynomial h described above. The values of the conic constant "k," and the higher-order correction terms "A2" through "A10" of the aspheric surface constituting the first specific example are as shown in Table 2 below.

TABLE 2

| PARAMETER | VALUE | PARAMETER | VALUE |
| --- | --- | --- | --- |
| 11th SURFACE | | 18th SURFACE | |
| Y CURVATURE RADIUS | 41.9320 | Y CURVATURE RADIUS | −34.3375 |
| CONIC CONSTANT (k) | 0.7246 | CONIC CONSTANT (k) | 0.1204 |
| 4th-ORDER COEFFICIENT (A) | 3.9881e−005 | 4th-ORDER COEFFICIENT (A) | 4.2645e−006 |
| 6th-ORDER COEFFICIENT (B) | 9.8654e−008 | 6th-ORDER COEFFICIENT (B) | 8.3314e−008 |
| 8th-ORDER | −2.3440e−010 | 8th-ORDER | 5.4232e−011 |

TABLE 2-continued

| PARAMETER | VALUE | PARAMETER | VALUE |
|---|---|---|---|
| COEFFICIENT (C) | | COEFFICIENT (C) | |
| 10th-ORDER COEFFICIENT (D) | 0.0000 | 10th-ORDER COEFFICIENT (D) | −1.7829e−013 |
| 19th SURFACE | | 25th SURFACE | |
| Y CURVATURE RADIUS | −81.4882 | Y CURVATURE RADIUS | −86.1911 |
| CONIC CONSTANT (k) | 0.0000 | CONIC CONSTANT (k) | 0.0000 |
| 4th-ORDER COEFFICIENT (A) | −1.0160e−005 | 4th-ORDER COEFFICIENT (A) | −8.3713e−006 |
| 6th-ORDER COEFFICIENT (B) | 6.8533e−008 | 6th-ORDER COEFFICIENT (B) | 2.5344e−008 |
| 8th-ORDER COEFFICIENT (C) | 0.0000 | 8th-ORDER COEFFICIENT (C) | −3.5253e−011 |
| 10th-ORDER COEFFICIENT (D) | 0.0000 | 10th-ORDER COEFFICIENT (D) | 9.5229e−015 |
| 26th SURFACE | | 27th SURFACE | |
| Y CURVATURE RADIUS | −40.4342 | Y CURVATURE RADIUS | −44.6690 |
| CONIC CONSTANT (k) | 0.0000 | CONIC CONSTANT (k) | 0.0000 |
| 4th-ORDER COEFFICIENT (A) | 3.8195e−006 | 4th-ORDER COEFFICIENT (A) | 1.7355e−006 |
| 6th-ORDER COEFFICIENT (B) | −1.1211e−008 | 6th-ORDER COEFFICIENT (B) | 8.6409e−009 |
| 8th-ORDER COEFFICIENT (C) | 3.9884e−011 | 8th-ORDER COEFFICIENT (C) | 1.0482e−011 |
| 10th-ORDER COEFFICIENT (D) | −4.4707e−014 | 10th-ORDER COEFFICIENT (D) | −1.9225e−014 |
| 28th SURFACE | | 29th SURFACE | |
| Y CURVATURE RADIUS | −73.3630 | Y CURVATURE RADIUS | −196.6430 |
| CONIC CONSTANT (k) | 0.0000 | CONIC CONSTANT (k) | 0.0000 |
| 4th-ORDER COEFFICIENT (A) | −5.7518e−006 | 4th-ORDER COEFFICIENT (A) | 9.4078e−009 |
| 6th-ORDER COEFFICIENT (B) | 1.2542e−008 | 6th-ORDER COEFFICIENT (B) | 3.7981e−013 |
| 8th-ORDER COEFFICIENT (C) | 3.1967e−012 | 8th-ORDER COEFFICIENT (C) | −1.0244e−017 |
| 10th-ORDER COEFFICIENT (D) | −1.1928e−014 | 10th-ORDER COEFFICIENT (D) | 4.0187e−022 |

Figure 11:
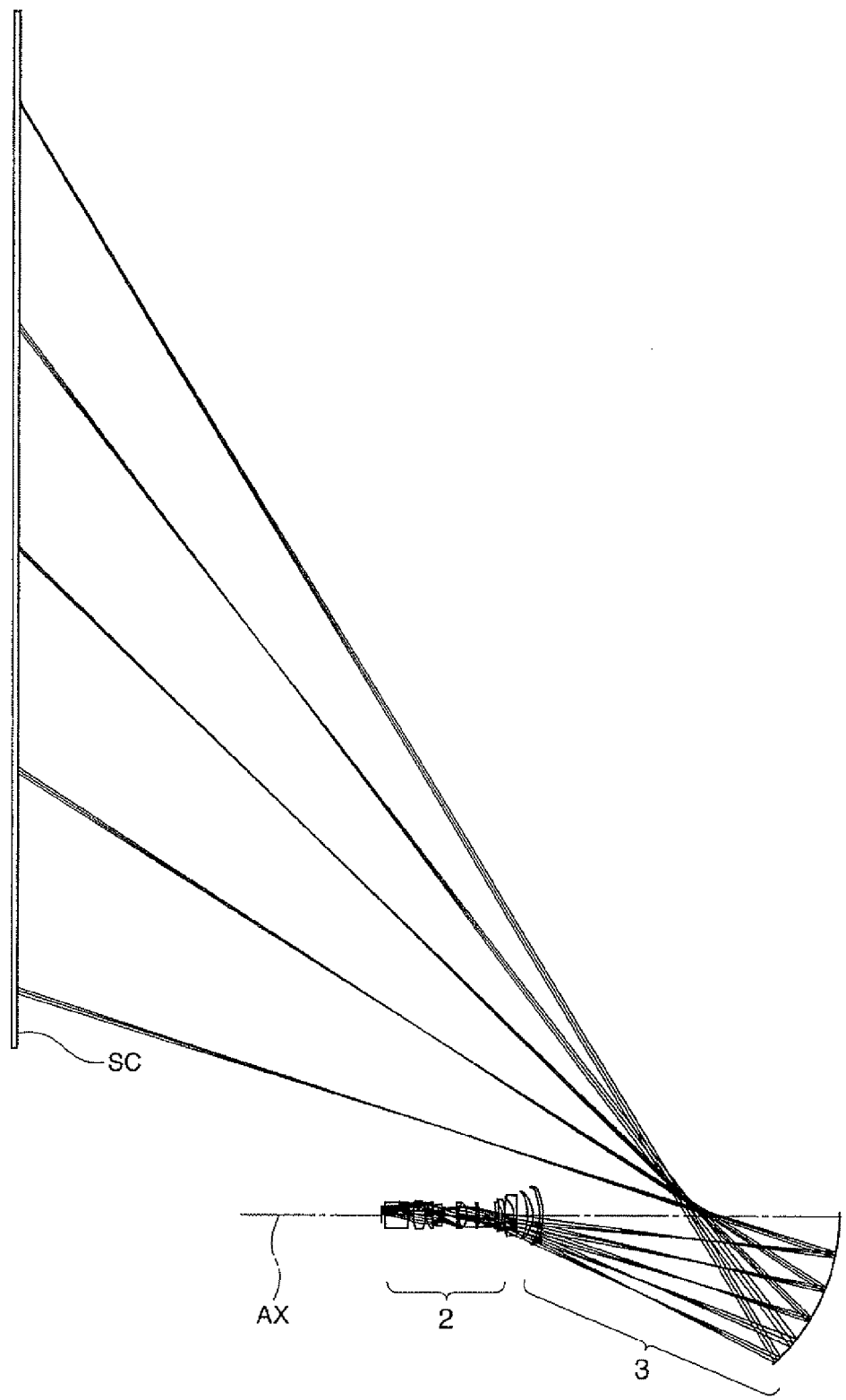
FIG. 11 is a diagram for explaining the ultra-short projection by the optical system of the first specific example shown in FIG. 10.

FIG. 11 shows the projection state to the screen SC in the case of connecting the projection unit 3 to the main body section 2. As is obvious from the drawing, the ultra-short projection is performed on the screen SC in a preferable imaging state.

Figure 12:
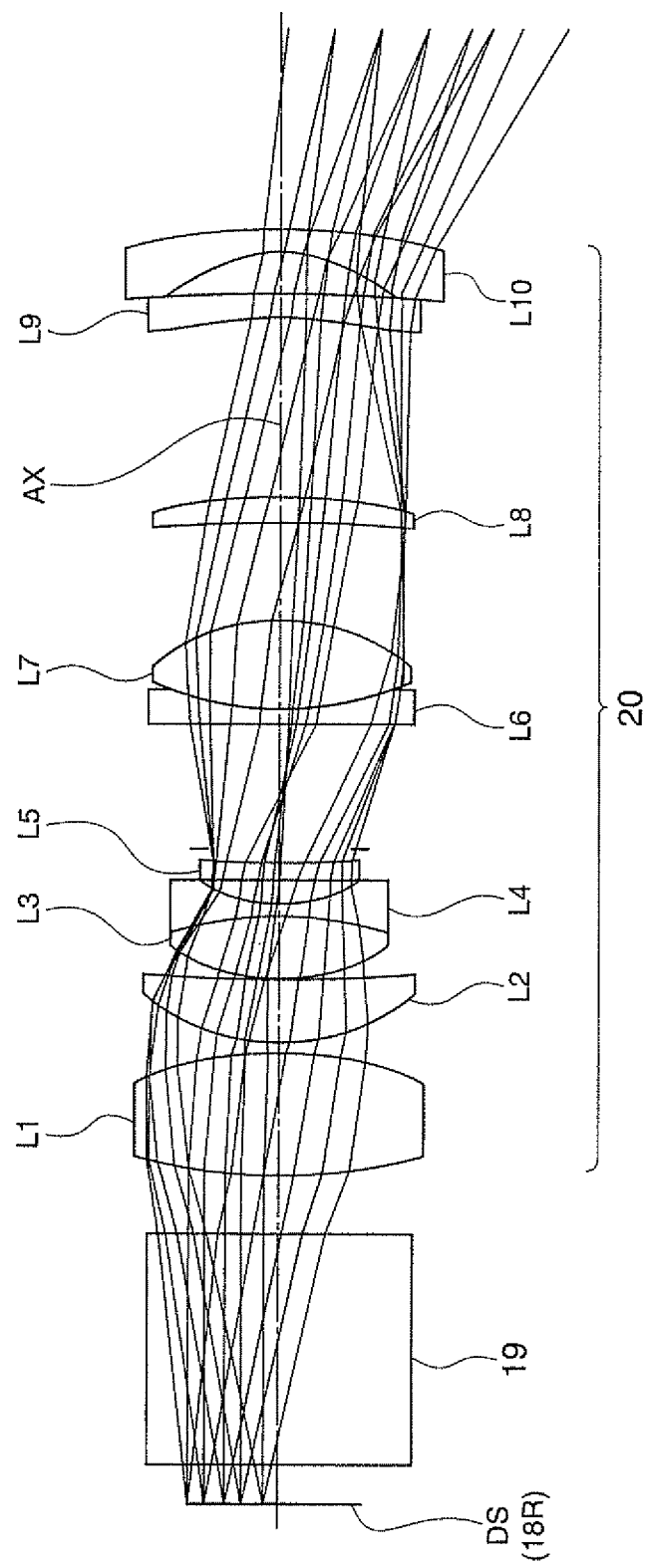
FIG. 12 is a diagram showing a state in which the projection unit is separated from the main body section.
Figure 13:
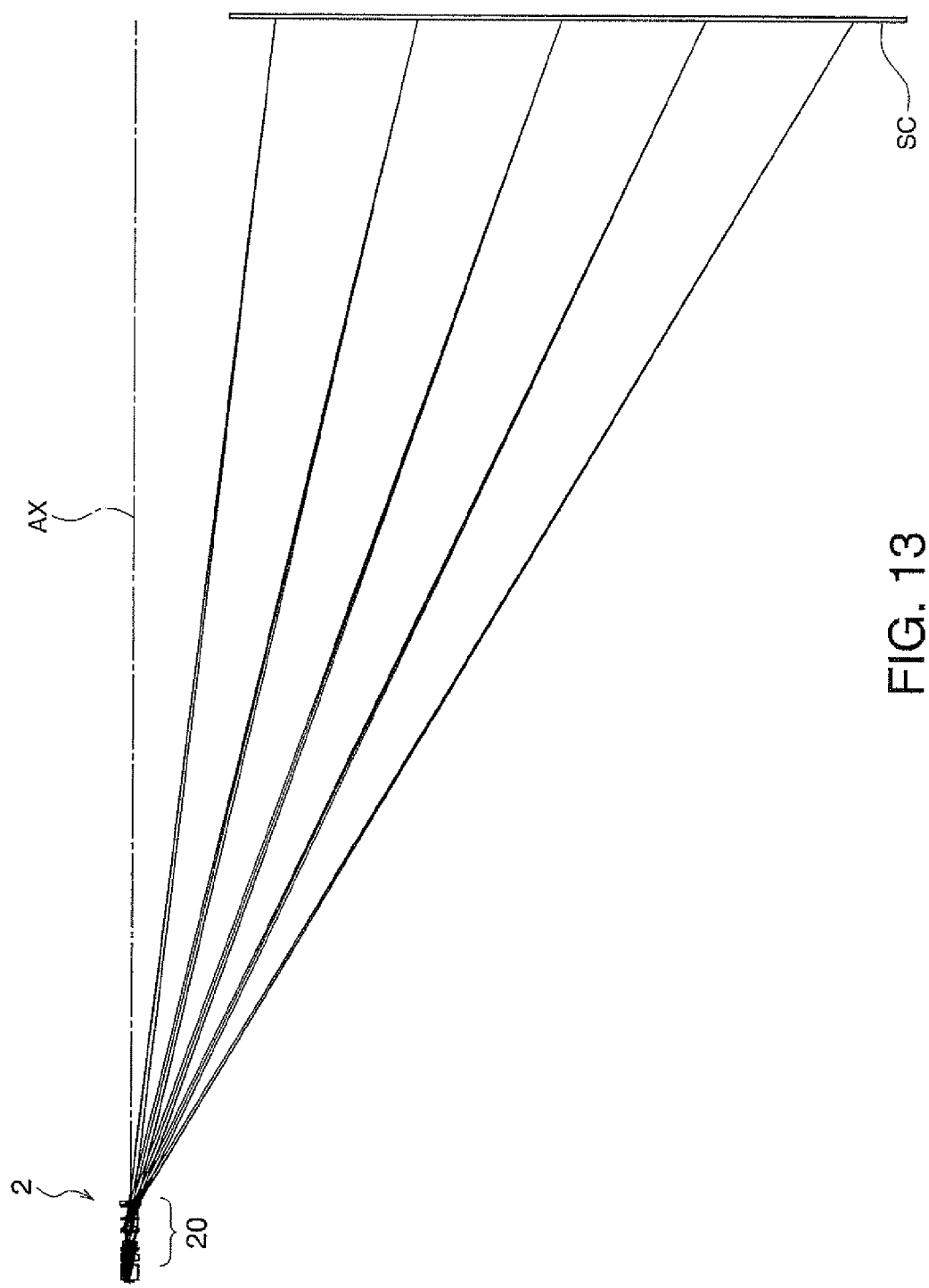
FIG. 13 is a diagram showing a state in which the projection unit is separated from the main body section.

FIGS. 12 and 13 show the state in which the projection unit 3 is separated from the main body section 2, and the projection lens 20 is set to the first mode. On this occasion, compared to the state shown in FIG. 10, the first lens L01 through the tenth lens L10 are integrally moved to the object side to thereby be set to the normal display state. Further, the image plane is not formed at a position close to the projection lens 20, but is formed on the screen SC.

Figure 14:
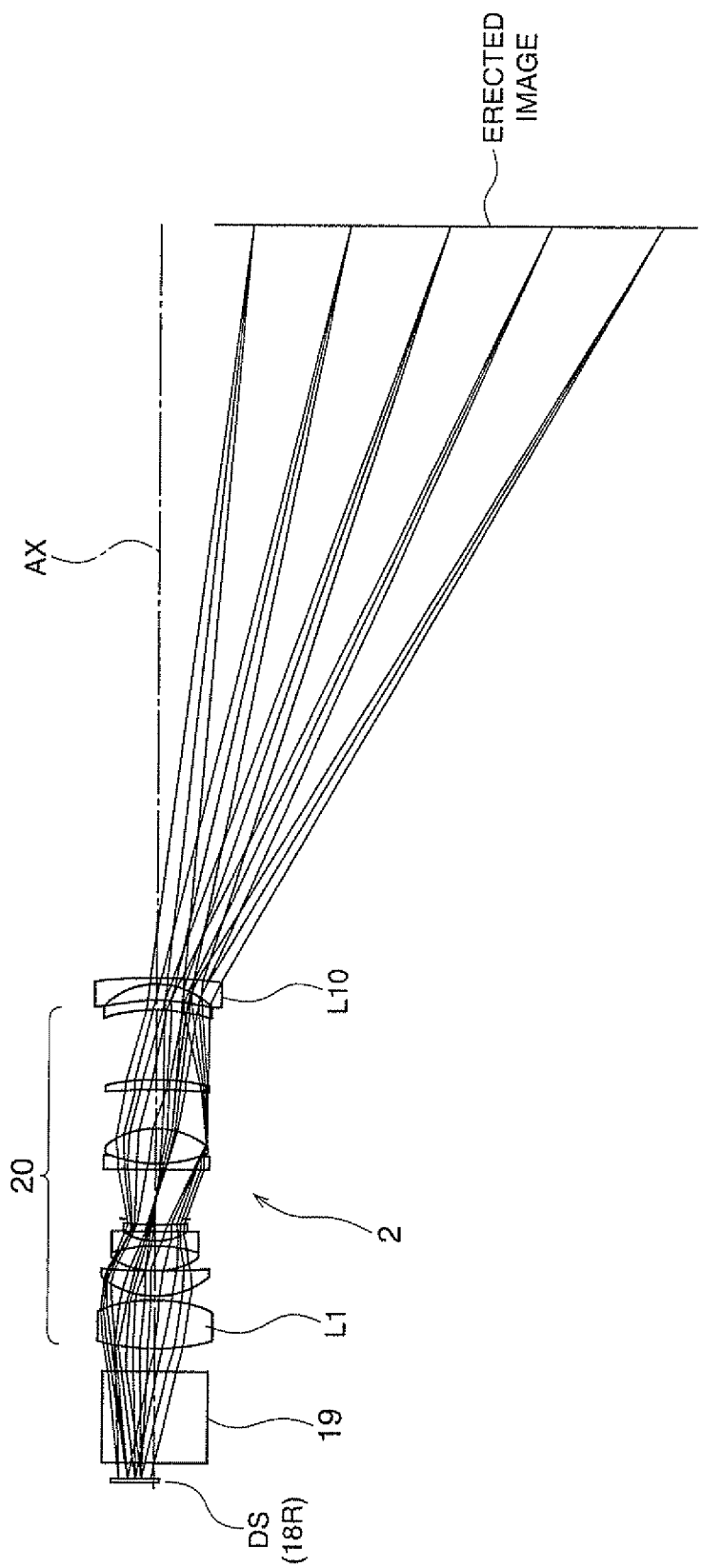
FIG. 14 is a diagram for explaining an operation of the optical system of the first specific example of the first embodiment.

FIG. 14 shows the state in which the projection unit 3 is separated from the main body section 2, and the projection lens 20 is set to the second mode. On this occasion, compared to the state shown in FIG. 13, the first lens L01 through the tenth lens L10 are integrally moved to the image plane side to thereby be set to the macro display state. Specifically, the image plane is not formed at a position close to the projection lens 20, but is formed on the screen SC. In contrast, in FIG. 14, an erected image is formed at a position close to the projection lens 20. As shown in FIG. 10, it is understood that the image plane IMGb, which is tilted and contracted, is formed in the anterior area of the angle-widening mirror 33 or the aspheric mirror AM by disposing the projection unit 3 in the main body section 2 shown in FIG. 14.

Second Specific Example

Figure 15:
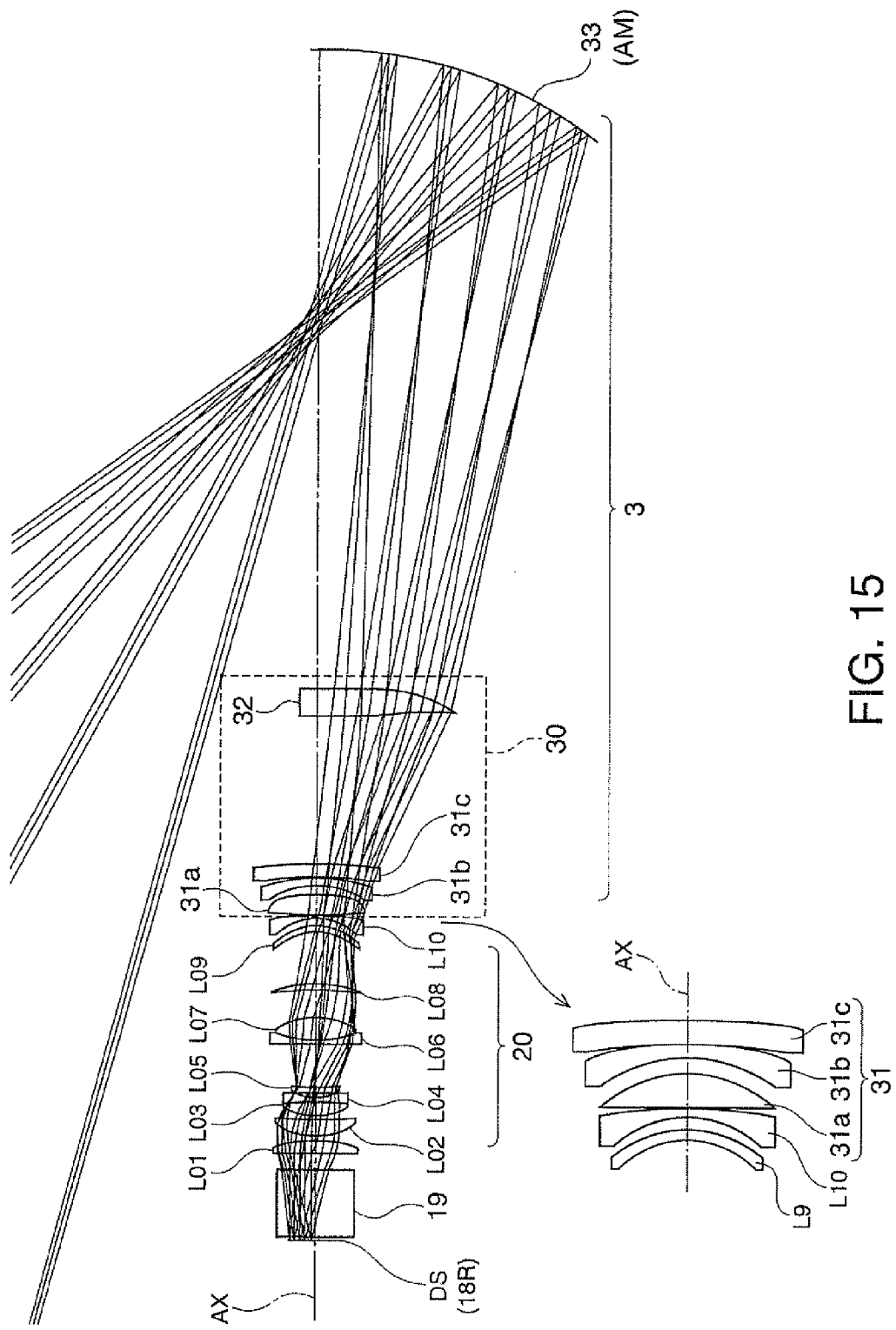
FIG. 15 is a diagram for explaining the optical system of a second specific example of the first embodiment.

FIG. 15 is a diagram for explaining a second specific example of the ultra-short projection by the combination of the projection lens 20 in the second mode and the projection unit 3. Here, the projection lens 20 has the lenses L01 through L10. Further, the projection unit 3 has the first and second lenses 31, 32, and the angle-widening mirror 33. Among these components, the first lens 31 includes three lenses 31a, 31b, and 31c.

Table 3 below shows lens data and so on of the second specific example. In Table 3, "SURFACE NUMBER," "SURFACE TYPE," "R (Y CURVATURE RADIUS)," "D (SURFACE INTERVAL)," "Nd," and "vd" denote like things in the first specific example.

TABLE 3

| SURFACE NUMBER | SURFACE TYPE | R (Y CURVATURE RADIUS) | D (SURFACE INTERVAL) | Nd | vd |
|---|---|---|---|---|---|
| OBJECT | SPHERICAL | INFINITE | 1.2542 | | |
| 1 | SPHERICAL | INFINITE | 25.7500 | 1.516800 | 64.2 |
| 2 | SPHERICAL | INFINITE | 6.0000 | | |
| 3 | SPHERICAL | 153.5530 | 5.4000 | 1.589130 | 61.2 |
| 4 | SPHERICAL | −37.9820 | 1.0000 | | |
| 5 | SPHERICAL | 23.1020 | 6.8760 | 1.696800 | 55.4 |
| 6 | SPHERICAL | 491.2720 | 0.2000 | | |
| 7 | SPHERICAL | 21.3190 | 6.3000 | 1.487490 | 70.4 |
| 8 | SPHERICAL | −62.4750 | 1.3000 | 1.805180 | 25.4 |
| 9 | SPHERICAL | 18.6880 | 2.4710 | | |
| 10 | SPHERICAL | −279.2930 | 1.4000 | 1.834000 | 37.3 |
| 11 | ASPHERIC | 41.9320 | 2.0000 | | |
| APERTURE SURFACE | SPHERICAL | INFINITE | 13.4250 | | |
| 13 | SPHERICAL | 160.0960 | 1.3000 | 1.806100 | 33.2 |
| 14 | SPHERICAL | 28.4050 | 9.5000 | 1.744000 | 44.9 |
| 15 | SPHERICAL | −29.7850 | 10.4790 | | |
| 16 | SPHERICAL | −99.1850 | 2.4000 | 1.805180 | 25.4 |
| 17 | SPHERICAL | −48.6980 | 19.4530 | | |
| 18 | ASPHERIC | −15.9240 | 2.2000 | 1.531160 | 56.0 |
| 19 | ASPHERIC | −21.5000 | 2.8000 | | |
| 20 | SPHERICAL | −20.3540 | 1.8000 | 1.696800 | 55.4 |
| 21 | SPHERICAL | −125.9050 | 0.1000 | | |
| 22 | SPHERICAL | −1081.5152 | 6.9484 | 1.621065 | 60.1 |
| 23 | SPHERICAL | −27.0773 | 3.1950 | | |
| 24 | SPHERICAL | −30.7560 | 2.6028 | 1.753578 | 27.6 |
| 25 | SPHERICAL | −78.5825 | 0.1706 | | |
| 26 | ASPHERIC | −136.8551 | 5.0000 | 1.492000 | 57.2 |
| 27 | ASPHERIC | −136.8310 | 56.3899 | | |
| 28 | ASPHERIC | 779.9694 | 10.0000 | 1.492000 | 57.2 |
| 29 | ASPHERIC | −210.4692 | 241.1414 | | |
| 30 | ASPHERIC | −152.4749 | −1000.0000 | | |
| IMAGE | SPHERICAL | INFINITE | 0.0000 | | |

In the second specific example, although the projection lens 20 and the projection unit 3 are basically formed of spherical surfaces, the entrance and exit surfaces of the fifth lens L05, the entrance and exit surfaces of the ninth lens L09, the entrance and exit surfaces of the lens 31c included in the first lens 31, the entrance and exit surfaces of the second lens 32, and the angle-widening mirror 33 are each formed of an aspheric surface. The displacement of the aspheric shape from the surface apex in the optical axis AX direction is provided as the polynomial h described above. The values of the conic constant "k," and the higher-order correction terms "A2" through "A10" of the aspheric surface constituting the second specific example are as shown in Table 4 below.

TABLE 4

| PARAMETER | VALUE | PARAMETER | VALUE |
|---|---|---|---|
| 11th SURFACE | | 18th SURFACE | |
| Y CURVATURE RADIUS | 41.9320 | Y CURVATURE RADIUS | −15.9240 |
| CONIC CONSTANT (k) | 0.7246 | CONIC CONSTANT (k) | −0.5143 |
| 4th-ORDER COEFFICIENT (A) | 3.9881e−005 | 4th-ORDER COEFFICIENT (A) | 1.1003e−005 |
| 6th-ORDER COEFFICIENT (B) | 9.8654e−008 | 6th-ORDER COEFFICIENT (B) | 8.1415e−008 |
| 8th-ORDER COEFFICIENT (C) | −2.3440e−010 | 8th-ORDER COEFFICIENT (C) | 1.1898e−012 |
| 10th-ORDER COEFFICIENT (D) | 0.0000 | 10th-ORDER COEFFICIENT (D) | 7.3903e−015 |
| 19th SURFACE | | 26th SURFACE | |
| Y CURVATURE RADIUS | −21.5000 | Y CURVATURE RADIUS | −136.8551 |
| CONIC CONSTANT (k) | 0.0000 | CONIC CONSTANT (k) | 36.7165 |
| 4th-ORDER COEFFICIENT (A) | −2.0653e−006 | 4th-ORDER COEFFICIENT (A) | 1.0360e−005 |
| 6th-ORDER COEFFICIENT (B) | 4.5141e−008 | 6th-ORDER COEFFICIENT (B) | −1.4310e−008 |
| 8th-ORDER COEFFICIENT (C) | 0.0000 | 8th-ORDER COEFFICIENT (C) | 1.6170e−011 |

TABLE 4-continued

| PARAMETER | VALUE | PARAMETER | VALUE |
|---|---|---|---|
| 10th-ORDER COEFFICIENT (D) | 0.0000 | 10th-ORDER COEFFICIENT (D) | −4.5542e−014 |
| 27th SURFACE | | 28th SURFACE | |
| Y CURVATURE RADIUS | −136.8310 | Y CURVATURE RADIUS | 779.9694 |
| CONIC CONSTANT (k) | −63.0353 | CONIC CONSTANT (k) | 99.8883 |
| 4th-ORDER COEFFICIENT (A) | 5.9624e−006 | 4th-ORDER COEFFICIENT (A) | 1.7204e−007 |
| 6th-ORDER COEFFICIENT (B) | −1.4951e−009 | 6th-ORDER COEFFICIENT (B) | 3.4703e−011 |
| 8th-ORDER COEFFICIENT (C) | −1.1974e−011 | 8th-ORDER COEFFICIENT (C) | −3.4333e−014 |
| 10th-ORDER COEFFICIENT (D) | −8.8669e−015 | 10th-ORDER COEFFICIENT (D) | −9.5928e−018 |
| 29th SURFACE | | 30th SURFACE | |
| Y CURVATURE RADIUS | −210.4692 | Y CURVATURE RADIUS | −152.4749 |
| CONIC CONSTANT (k) | 7.9092 | CONIC CONSTANT (k) | −0.7102 |
| 4th-ORDER COEFFICIENT (A) | 1.8082e−007 | 4th-ORDER COEFFICIENT (A) | 1.0381e−008 |
| 6th-ORDER COEFFICIENT (B) | −1.0063e−010 | 6th-ORDER COEFFICIENT (B) | −4.2963e−013 |
| 8th-ORDER COEFFICIENT (C) | 4.9845e−014 | 8th-ORDER COEFFICIENT (C) | 5.7868e−019 |
| 10th-ORDER COEFFICIENT (D) | −2.8298e−017 | 10th-ORDER COEFFICIENT (D) | 2.8906e−022 |

Figure 16:
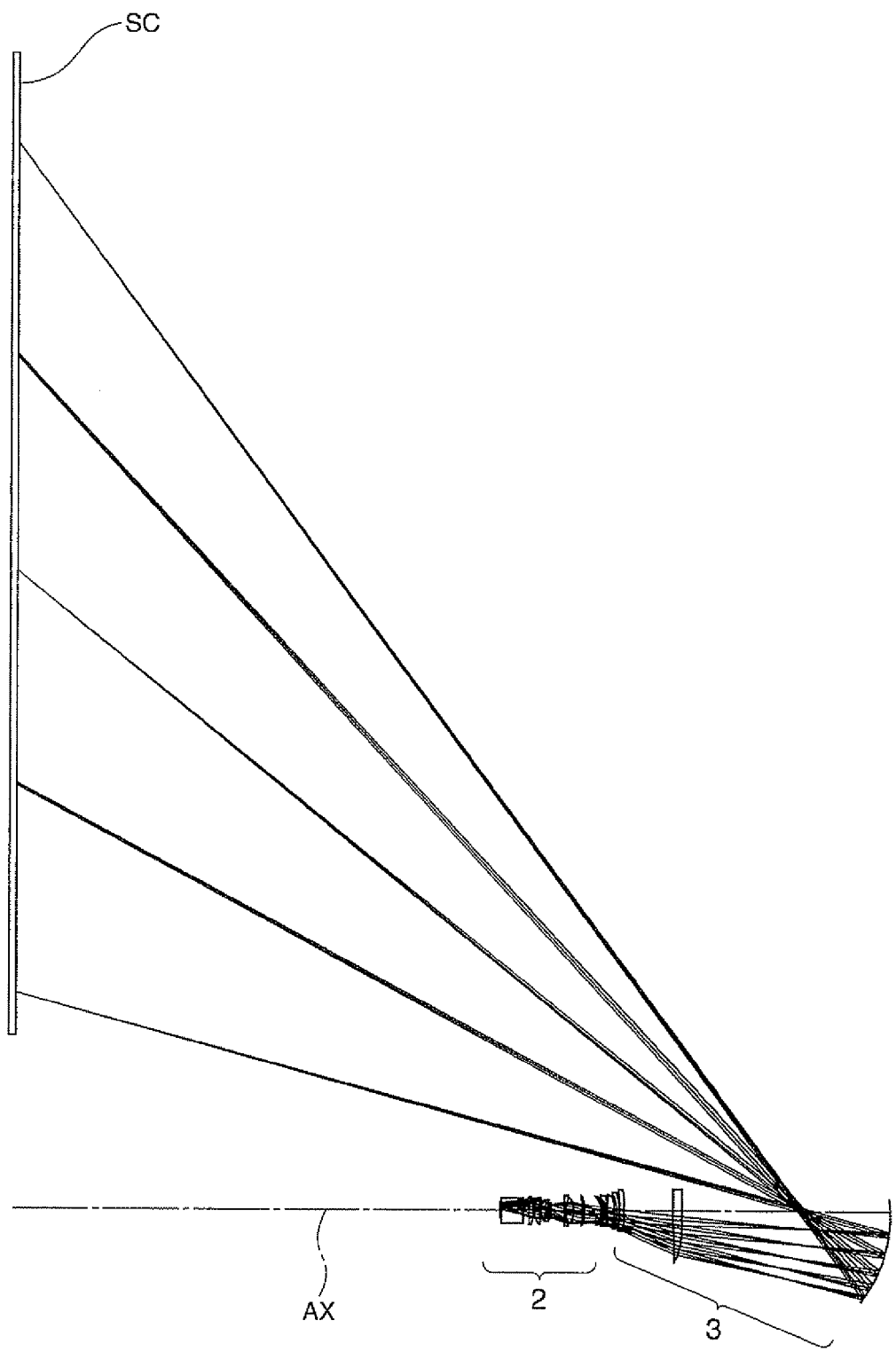
FIG. 16 is a diagram for explaining the ultra-short projection by the optical system of the second specific example shown in FIG. 15.

FIG. 16 shows the projection state to the screen SC in the case of connecting the projection unit 3 to the main body section 2. As is obvious from the drawing, the ultra-short projection is performed on the screen SC in a preferable imaging state.

Figure 17:
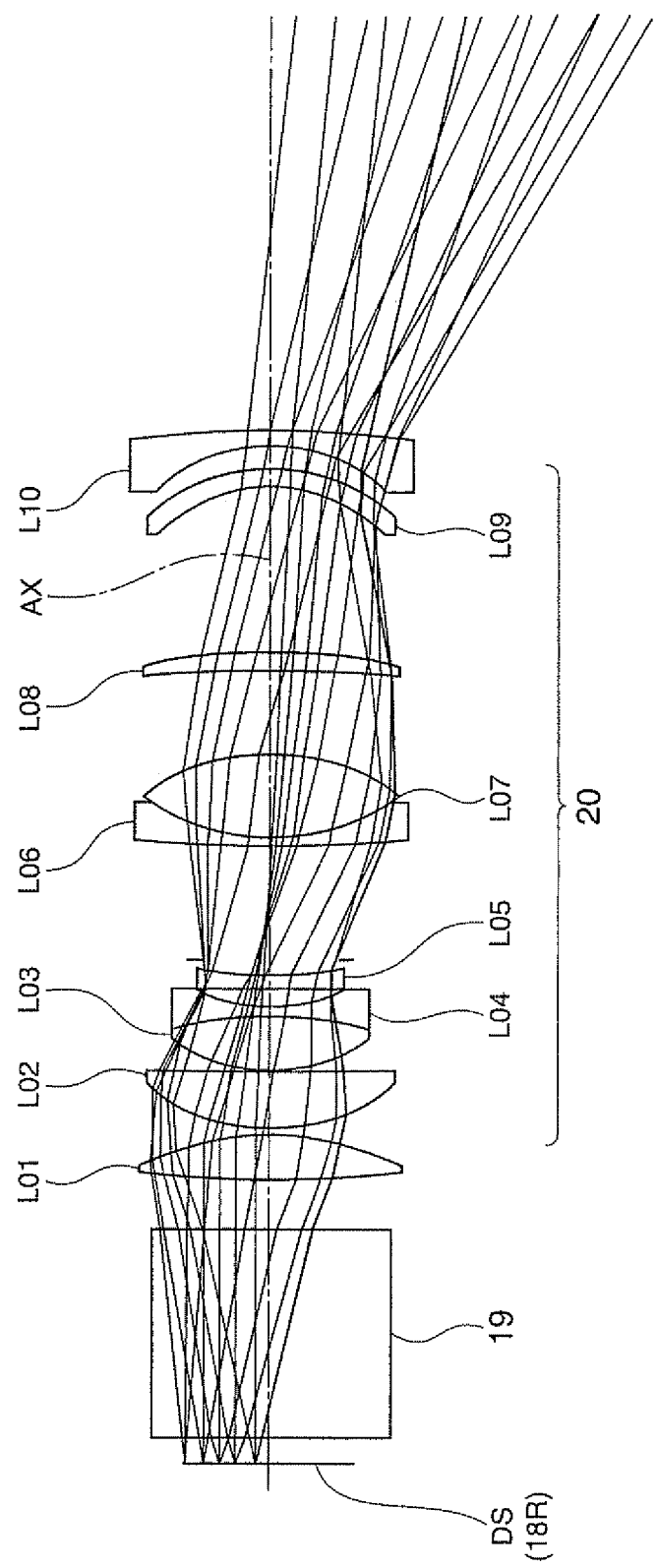
FIG. 17 is a diagram showing a state in which the projection unit is separated from the main body section.

FIG. 17 shows the state in which the projection unit 3 is separated from the main body section 2, and the projection lens 20 is set to the first mode. On this occasion, compared to the state shown in FIG. 15, the first lens L01 through the tenth lens L10 are integrally moved to the object side to thereby be set to the normal display state.

Figure 18:
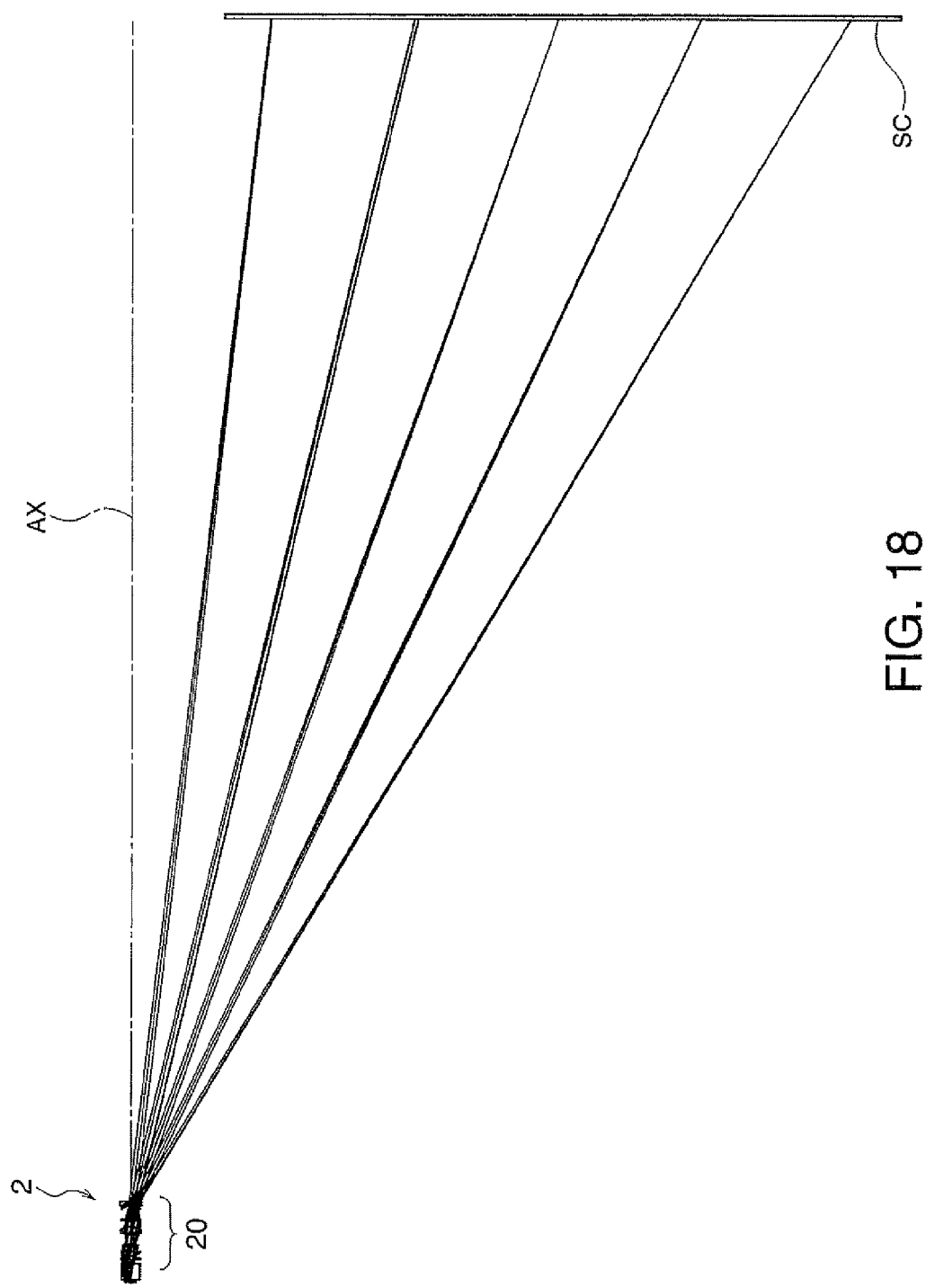
FIG. 18 is a diagram for explaining the middle and long-distance projection in the case in which the projection unit is separated from the main body section.

FIG. 18 corresponds to FIG. 17, and shows the projection state to the screen SC in the case of separating the projection unit 3 from the main body section 2. On this occasion, the projection lens 20 is set to the normal display mode. As is obvious from the drawing, the ultra-short projection is performed on the screen SC in a preferable imaging state by the projection lens 20 alone.

Figure 19:
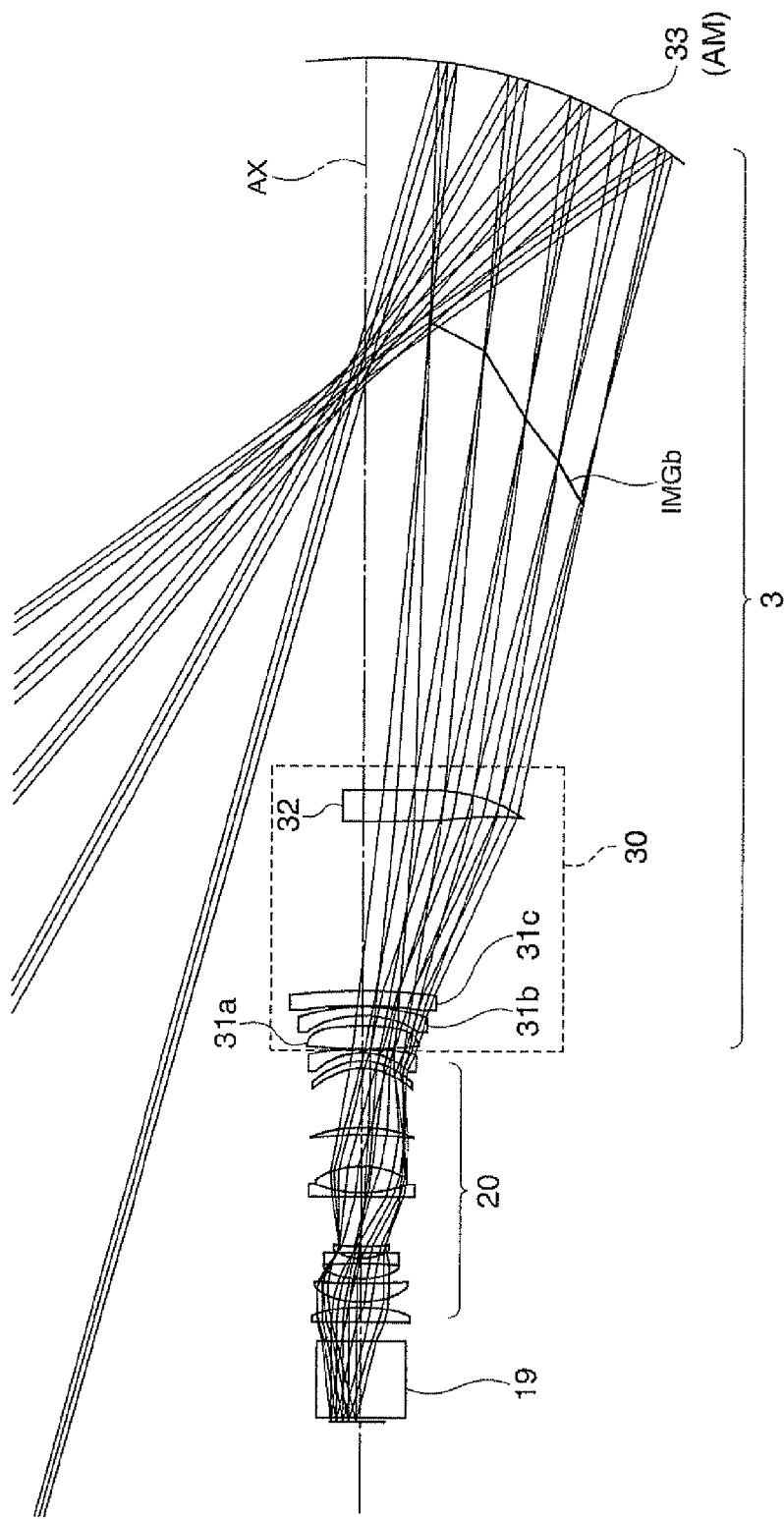
FIG. 19 is a diagram for explaining the image plane in the ultra-short projection.

FIG. 19 is a diagram for explaining an imaging state in the ultra-short projection by the combination of the projection lens 20 in the second mode and the projection unit 3. It is understood that the image plane IMGb, which is tilted and contracted, is formed in the anterior area of the angle-widening mirror 33 or the aspheric mirror AM by disposing the projection unit 3 in this manner.

Figure 20:
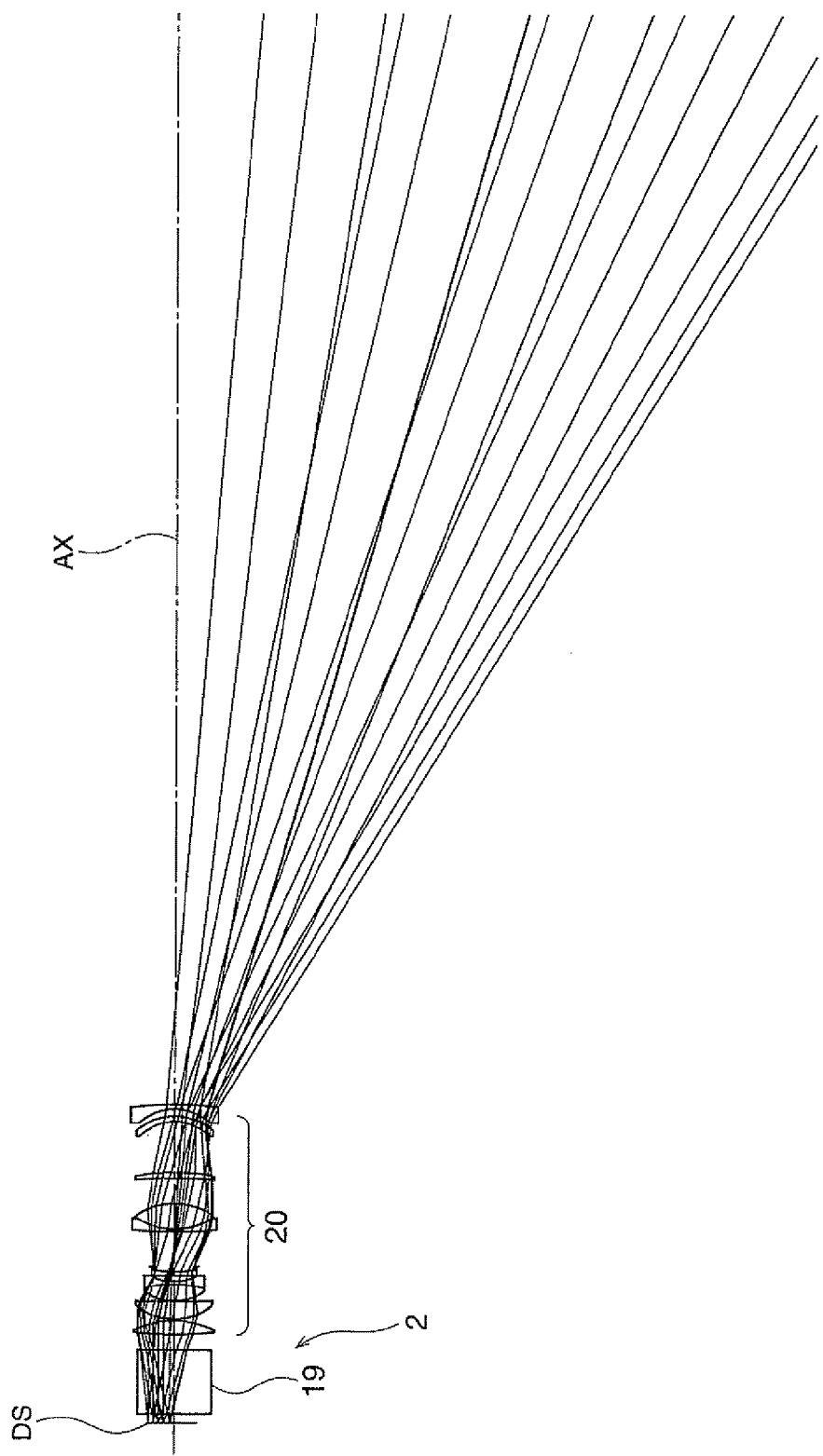
FIG. 20 is a diagram for explaining an imaginary state in the case in which the projection unit is separated from the main body section.

FIG. 20 shows the state in which the projection unit 3 is separated from the main body section 2, and the projection lens 20 alone is set to the first mode. On this occasion, compared to the state shown in FIG. 18, the first lens L01 through the tenth lens L10 are integrally moved to the image plane side. Further, in the second mode, there is a feature that an image is formed nowhere. In other words, as shown in FIG. 19, the tilted image plane IMGb is formed by combining the projection unit 3 with the projection lens 20.

Second Embodiment

Figure 21:
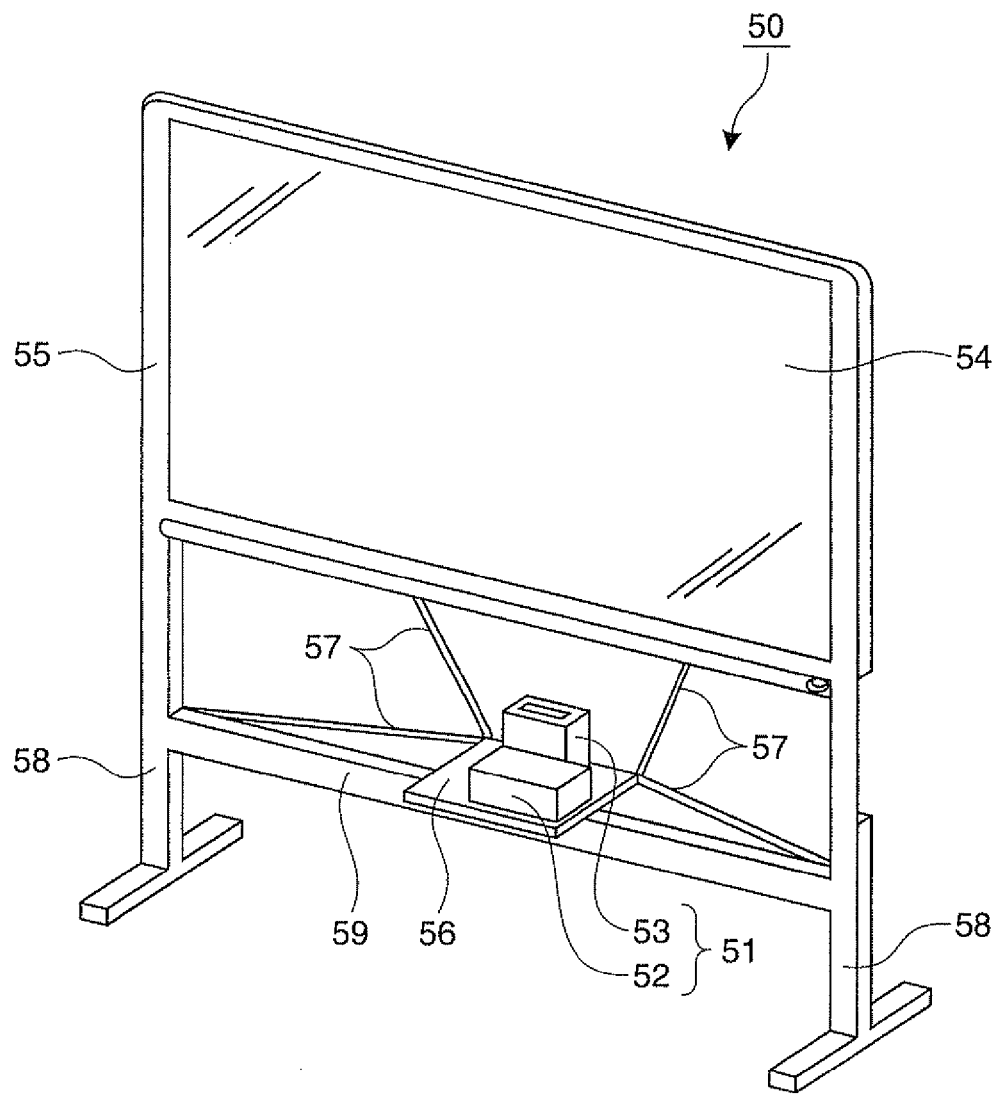
FIG. 21 is a front perspective view of an interactive board according to a second embodiment of the invention.

FIG. 21 is a front perspective view of an interactive board 50 according to a second embodiment of the invention. The interactive board 50 is provided with a projector 51 having substantially the same configuration as the projector 1 (see FIG. 1 and so on) according to the first embodiment, and a screen display section 54 disposed above the projector 51. Here, the projector 51 has a main body section 52 and a projection unit 53.

The main body section 52 emits the picture light corresponding to the image signal. The projection unit 53 projects the picture light from the main body section 52 toward the screen display section 54. The main body section 52 and the projection unit 53 have substantially the same configurations as those of the main body section 2 (see FIG. 2 and so on) and the projection unit 3 (see FIG. 4 and so on) explained in the first embodiment, respectively. The optical elements of the projection unit 53 are housed in a housing. The housing is provided with an opening for emitting the picture light.

The screen display section 54 displays an image by the picture light input from the projector 51, and makes it possible to write a picture on the display surface. The screen display section 54 is made of a material of transmitting light such as semi-transmissive glass or synthetic resin. The user writes characters or pictures to the screen display section 54 using a writing tool such as a pen or a pointing stick. Further, the user erases the writing to the screen display section 54 using a erasing tool or the like.

The interactive board 50 is provided with a reading device (not shown) besides the above. The reading device reads the writing content written on the display surface of the screen display section 54, the picture displayed on the screen display section 54, and information and so on input by making a tool have contact with or come closer to the screen display section 54. As the reading device, for example, an image sensor such as a CCD camera is used. By providing the interactive board 50 with such a reading device, it becomes possible to record the writing content to the screen display section 54, the picture displayed thereon at that moment, the input information, and so on.

The screen display section 54 is installed while being attached to a base 55 shaped like a frame. A projector fixation section 56 as a plate like member to which the projector 51 is fixed is disposed on a prismatic column 59 connecting two leg sections 58 out of the base 55. The projector 51 is attached vertically below the screen display section 54 using the projector fixation section 56. Four rod-like members 57 radially extending so as to connect the projector fixation section 56 and the base 55 function as reinforcing members for reinforcing the attachment strength of the projector fixation section 56 in the base 55. Each of the rod-like members 57 is disposed between the projector 51 and the screen display section 54 on the periphery of the area, in which the picture light indicated by the dashed arrows in the drawing proceeds, so as not to interfere the picture light.

Figure 22:
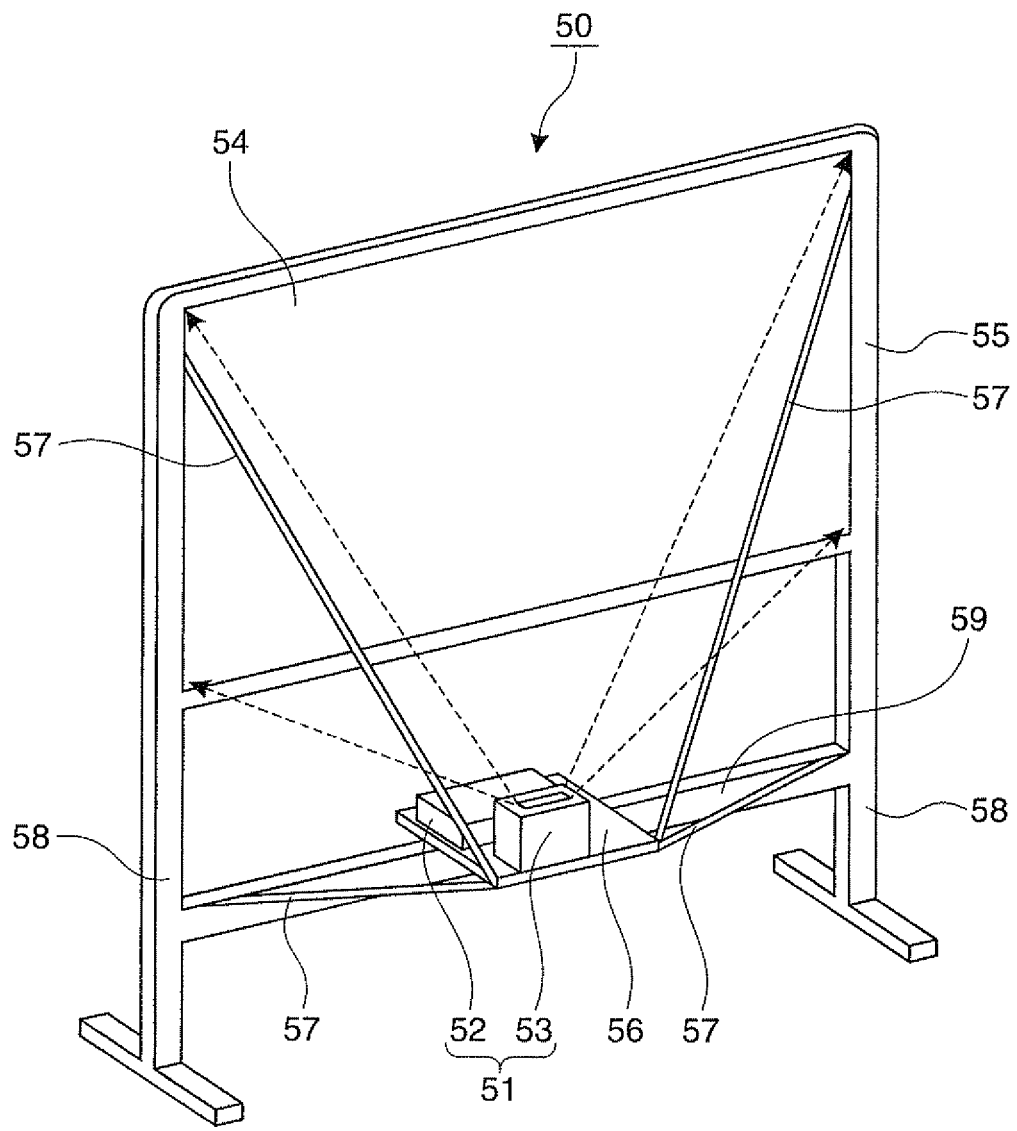
FIG. 22 is a rear perspective view of the interactive board.

FIG. 22 is a rear perspective view of the interactive board 50. The projector 51 performs the ultra-short projection of the picture light to the rear surface of the screen display section 54 on the opposite side to the front side on which the picture is observed. The screen display section 54 transmits the picture light, which is input to the rear surface (i.e., the irradiated surface) from the projector 51, to the front side. The screen display section 54 is provided with a light diffusion property of diffusing the picture light input from the projector 51. The screen display section 54 displays the picture displayed by inputting the image light from the rear surface while superimposing the characters, pictures, and so on written on the obverse surface. The observer observes the characters, pictures, and so on written on the obverse surface and the picture light diffused by the screen display section 54.

Figure 23A:
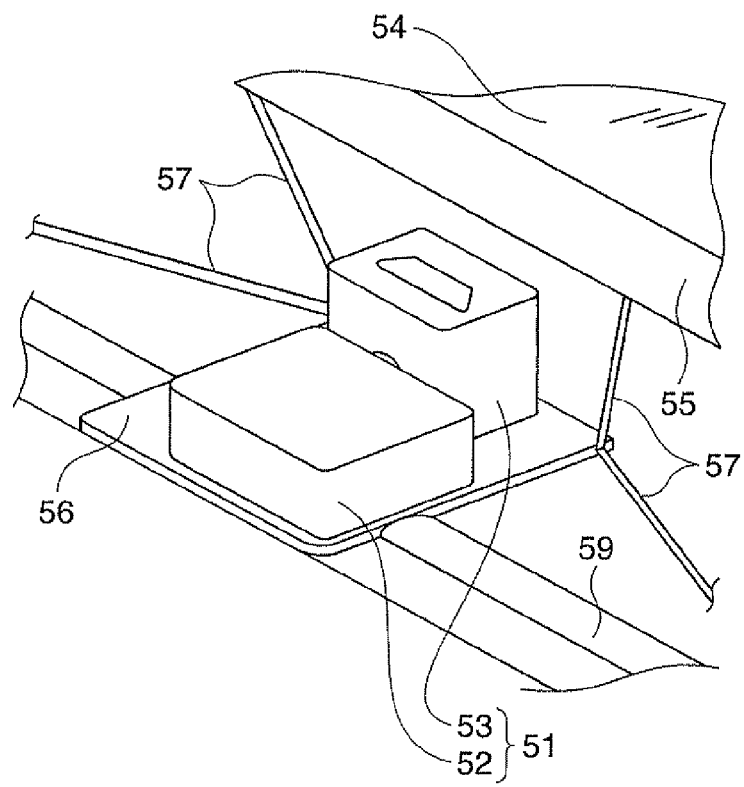
FIG. 23A is a diagram showing a projector fixation section and the peripheral section thereof.

FIG. 23A is a diagram showing the projector fixation section 56 and the peripheral section thereof in the state in which the projector 51 is installed out of the interactive board 50. In the interactive board 50, by fixing the projector 51 to the base 55 using the projector fixation section 56, it becomes possible to hold the projector 51 in the condition of being aligned with the screen display section 54 with high accuracy. Thus, it becomes possible to display a high-resolution picture in the screen display section 54. It should be noted that the projection unit 53 of the projector 51 is fixed to the projector fixation section 56, and the main body section 52 of the projector 51 is arranged to be able to be separated from the projection unit 53, and can be separated as a unit from the projector fixation section 56.

Figure 23B:
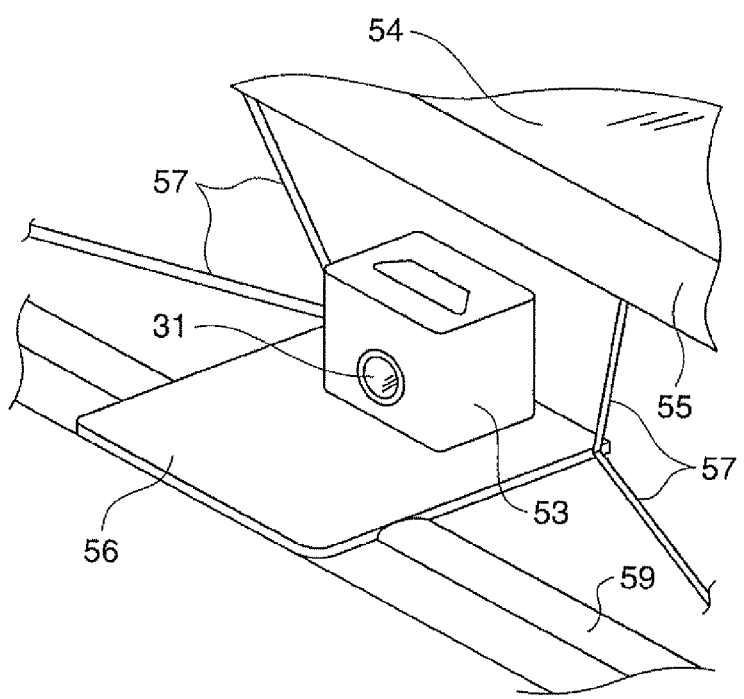
FIG. 23B is a diagram showing a state in which the main body section is detached in the state shown in FIG. 23A.

FIG. 23B is a diagram showing the state in which the main body section 52 is detached therefrom in the state shown in FIG. 23A. The main body section 52 is arranged to be detachably attached to the projector fixation section 56 if necessary, and is arranged to be able to be used alone. Thus, the use (the ultra-short projection) of the main body section 52 as the interactive board 50 by attaching the main body section 52 to the projector fixation section 56, and the middle and long-distance projection by detaching the main body section 52 from the interactive board 50 become possible.

By adopting the configuration of disposing the projector 51 vertically below the screen display section 54, the main body section 52 is installed at a lower position in the interactive board 50. Thus, the attachment of the main body section 52 to the interactive board 50 can be made easy.

Figure 24:
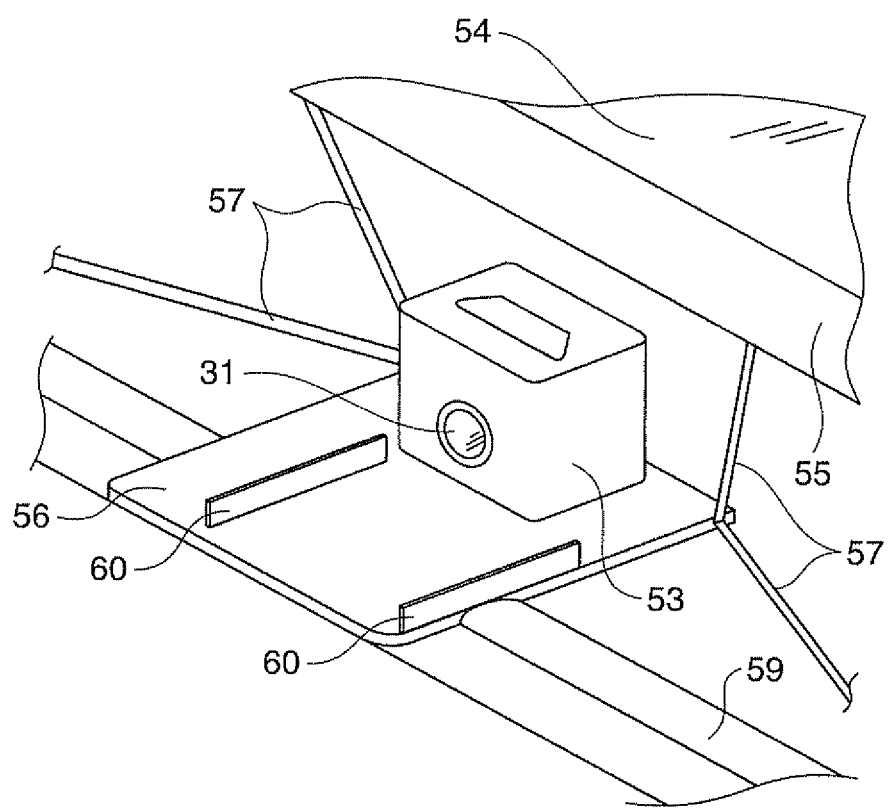
FIG. 24 is a diagram showing the projector fixation section provided with a guide structure.

It should be noted that it is also possible to arrange that the projector fixation section 56 is provided with a guide structure 60 for aligning the main body section 52 as shown in FIG. 24. As the guide structure 60, a plate-like member formed so as to follow the side surface of the main body section 52, for example, is used. By sliding the main body section 52 on the projector fixation section 56 along the guide structure 60, and then making the main body section 52 have contact with a case of the projection unit 53, the main body section 52 is positioned. Thus, the main body section 52 can easily be installed at a correct position every time the main body section 52 is attached to the interactive board 50. It should be noted that the guide structure 60 is not limited to the configuration illustrated here, but any configuration can be adopted providing the main body section 52 can be aligned with the projection unit 53 and so on in the interactive board 50.

Figure 25:
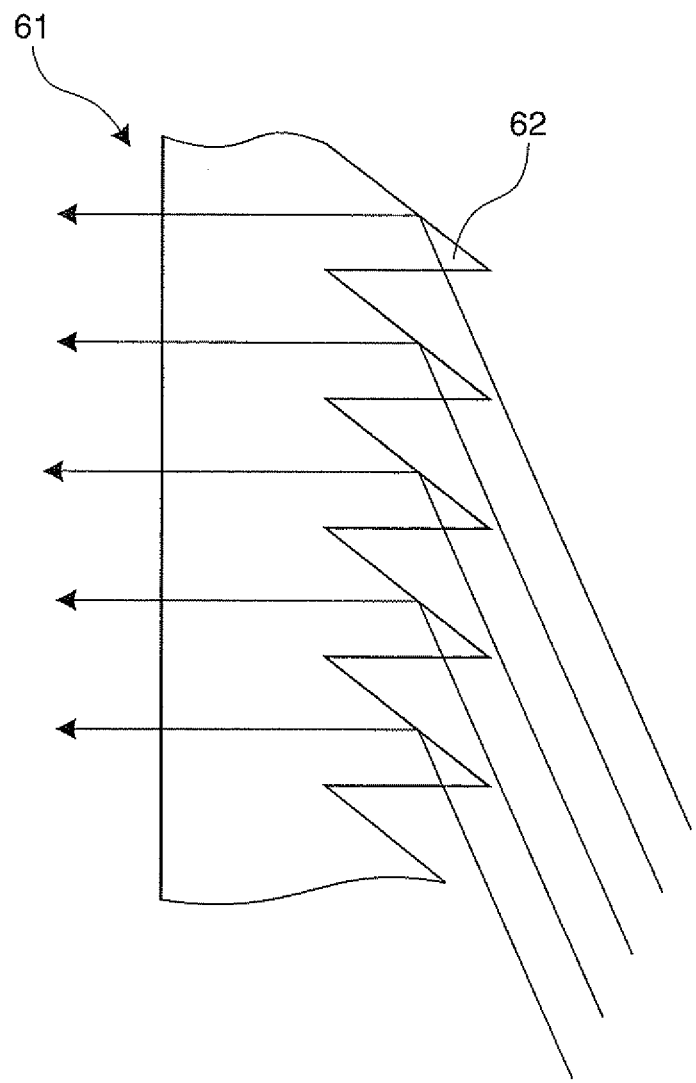
FIG. 25 is a schematic cross-sectional view of a Fresnel lens provided to a screen display section.

FIG. 25 is a schematic cross-sectional view of a Fresnel lens 61 provided to the screen display section 54. The Fresnel lens 61 is formed on the rear surface on the side, to which the picture light from the projector 51 is input, out of the screen display section 54. The Fresnel lens 61 functions as an angular conversion section for performing the angular conversion on the picture light. The Fresnel lens 61 is provided with a plurality of prism structures 62 each forming a roughly triangular cross-sectional shape. The prism structures 62 are arranged in a roughly concentric pattern centered on, for example, the optical axis AX (see FIG. 4 and so on). The Fresnel lens 61 performs the angular conversion on the picture light obliquely proceeding to the screen display section 54 to thereby make the picture light efficiently proceed toward the observer. Thus, it becomes possible for the interactive board 50 to display the picture, which is bright and has even brightness, in the screen display section 54.

The interactive board 50 adopts the projector 51 for the ultra-short projection with a super short-distance to thereby reduce the size in the depth direction. Further, by making it possible for the main body section 52 to perform the middle and long-distance projection by itself, a high level of versatility and convenience can be assured. By applying the projector 51 for enlarged projection capable of assuring a sufficient size in a short distance, it becomes possible for the interactive board 50 to reduce the weight, the power consumption, and the cost. Thus, there can be obtained an advantage of making it possible to reduce the weight, the power consumption, and the cost, and to suppress the depth size, and thus obtaining a high level of convenience.

Figure 26:
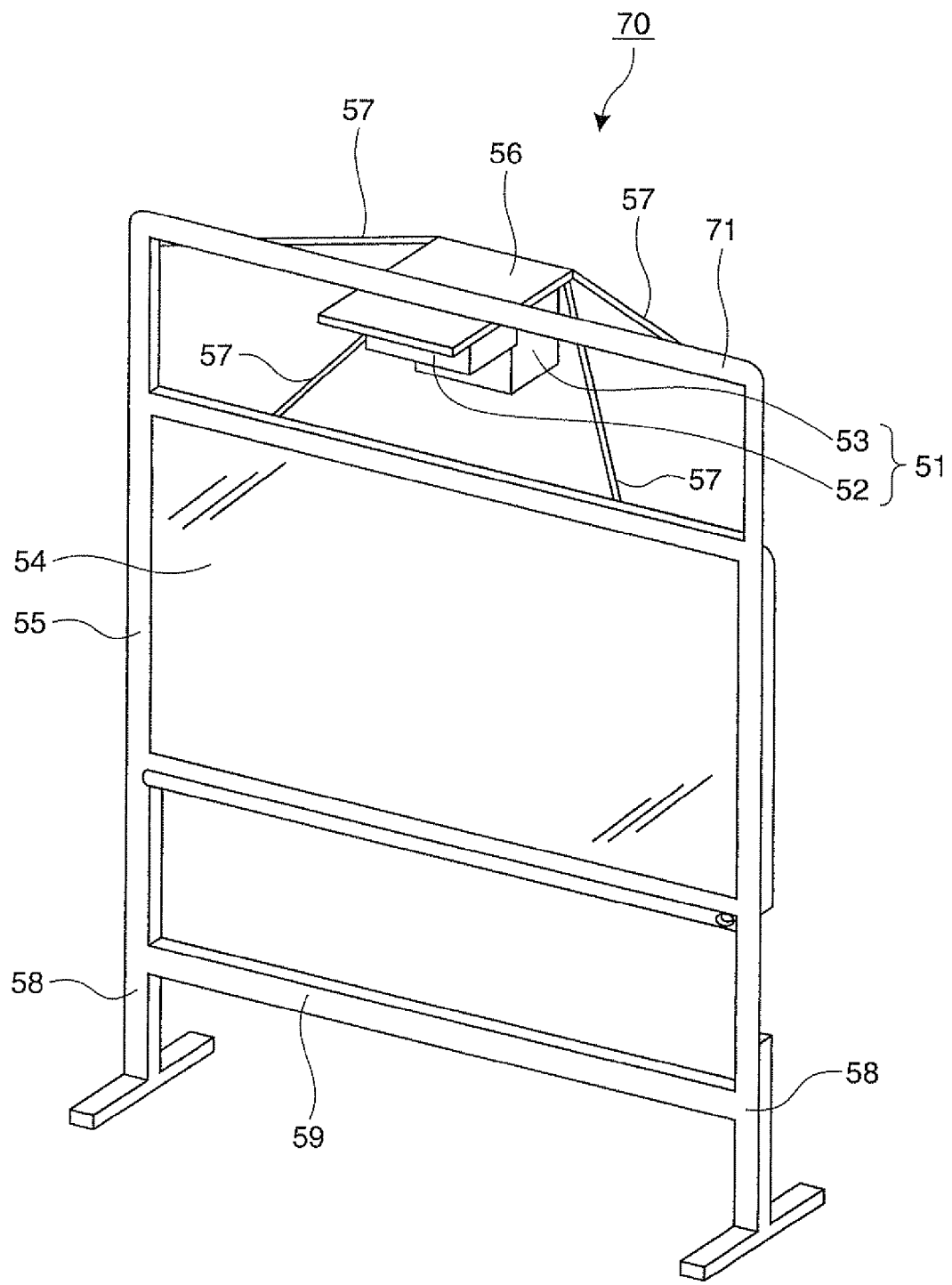
FIG. 26 is a front perspective view of an interactive board according to a modified example of the second embodiment.

FIG. 26 is a front perspective view of an interactive board 70 according to a modified example of the present embodiment. The interactive board 70 according to the modified example has a feature of attaching the projector 51 to the screen display section 54 on the vertically upside thereof. The projector fixation section 56 fixes the projector 51 to the prismatic column 71 disposed above the screen display section 54 out of the base 55.

By disposing the projector 51 vertically upside of the screen display section 54, the picture light is input to the screen display section 54 from the vertically upside. It results that the shadow of the writing tool occurs in the vertically downward direction when the user performs the writing to the screen display section 54. Thus, it is possible to reduce the case of losing the sight of the writing position due to the shadow to thereby enhance the convenience.

Although the projector 1, 51 according to the embodiments described above illuminate the entire desired area of each of the liquid crystal panels 18R, 18G, and 18B with roughly even brightness using the optical system provided with the first lens array, the second lens array, and the overlapping lens, the invention is not limited thereto, but it is also possible to illuminate the entire desired area of each of the liquid crystal panels 18R, 18G, and 183 using other illumination optical system such as an optical system provided with a light guide rod.

Although the projectors 1, 51 in the first and second embodiments described above are each applied as a front projector for projecting the projection image from the side of the observation in the case of, for example, the middle and long-distance projection, the invention can also be applied to a rear projector for projecting the projection image from the opposite side to the side of the observation.

Although the explanation is presented exemplifying the projectors 1, 51 according to the embodiments described above with the projector using the three liquid crystal panels, the invention is not limited thereto, but can be applied to the projector using one, two, four, or more liquid crystal panels.

The entire disclosure of Japanese Patent Application No. 2011-117677, filed May 26, 2011 and Japanese Patent Application No. 2011-081648, filed Apr. 1, 2011 are expressly incorporated by reference herein.

What is claimed is:

1. A projector comprising:
a main body section having a light source, a display surface illuminated by light from the light source, and an emission optical system adapted to emit light from the display surface; and
a projection unit adapted to project light from the emission optical system toward an irradiated surface, the light being emitted from the display surface,
the projection unit including:
an image plane control optical system adapted to change the light emitted from the emission optical system to light forming an image plane of the display surface tilted with respect to the display surface, the image plane control optical system including a plurality of lenses,
a master lens that adapted to perform middle and long distance projection in a first range, and adapted to perform ultra-short projection in a second range, the second range being a range that is lower than the first range, and
an angle-widening mirror with a concave surface having positive power and adapted to reflect light forming an image plane of the display surface tilted with respect to the display surface and widen an angle of the light; and
the main body section being arranged to be detachably attached to the projector or moved within the projector and the main body section projecting light to the irradiated surface alone.

2. The projector according to claim 1, wherein
the projection unit includes a variable power optical system adapted to vary magnification of the image forming the image plane of the display surface tilted with respect to the display surface, the variable power optical system including the plurality of lenses.

3. The projector according to claim 2, wherein
the variable power optical system is a contraction optical system adapted to relatively contract the image forming the image plane of the display surface tilted with respect to the display surface.

4. The projector according to claim 1, wherein
the projection unit images the image plane of the display surface tilted with respect to the display surface on the irradiated surface parallel to the display surface.

5. The projector according to claim 1, wherein
the emission optical system can be switched between
a normal display state in which an image forming the image plane of the display surface parallel to the display surface is imaged within a first range with a relatively long distance along an optical axis, and
a macro display state in which an image forming the image plane of the display surface parallel to the display surface is imaged within a second range with a relatively short distance along the optical axis.

6. The projector according to claim 1, wherein
the main body section is detachably attached to the projector.

7. The projector according to claim 1, wherein
the emission optical system and the projection unit are arranged so as to have respective optical axes aligned with each other.

8. The projector according to claim 7, wherein
the emission optical system and the projection unit constitute a shift optical system adapted to make the light from the display surface proceed while being shifted from the optical axis.

9. A projection unit used in a projector in combination with a main body section including a light source, a display surface irradiated with light from the light source, and an emission optical system adapted to emit light from the display surface, and adapted to project the light from the emission optical system, which is emitted from the display surface, toward an irradiated surface, the main body section being arranged to be detachably attached to the projector or moved within the projector and the main body section projecting light to the irradiated surface alone, the projection unit comprising: an image plane control optical system adapted to change the light emitted from the emission optical system to light forming the image plane of the display surface tilted with respect to the display surface, the image plane control optical system including a plurality of lenses, a master lens that adapted to perform middle and long distance projection in a first range, and adapted to perform ultra-short projection in a second range, the second range being a range that is lower than the first range, and an angle-widening mirror with a concave surface having positive power and adapted to reflect light forming an image plane of the display surface tilted with respect to the display surface, and widen the angle of the light.

10. The projection unit according to claim 9, further comprising: a variable power optical system including the plurality of lenses and adapted to vary magnification of the image forming the image plane of the display surface tilted with respect to the display surface.

11. An interactive board comprising:
the projector according to claim 1; and
a screen display section including the irradiated surface, and adapted to make it possible to write other information on the irradiated surface,
wherein the main body section including the emission optical system out of the projector is detachably attached.

12. An interactive board comprising:
the projector according to claim 2; and
a screen display section including the irradiated surface, and adapted to make it possible to write other information on the irradiated surface,
wherein the main body section including the emission optical system out of the projector is detachably attached.

13. An interactive board comprising:
the projector according to claim 3; and
a screen display section including the irradiated surface, and adapted to make it possible to write other information on the irradiated surface,
wherein the main body section including the emission optical system out of the projector is detachably attached.

14. An interactive board comprising:
the projector according to claim 4; and
a screen display section including the irradiated surface, and adapted to make it possible to write other information on the irradiated surface, wherein the main body section including the emission optical system out of the projector is detachably attached.

15. An interactive board comprising:
the projector according to claim 5; and
a screen display section including the irradiated surface, and adapted to make it possible to write other information on the irradiated surface,
wherein the main body section including the emission optical system out of the projector is detachably attached.

16. An interactive board comprising:
the projector according to claim 6; and
a screen display section including the irradiated surface, and adapted to make it possible to write other information on the irradiated surface,
wherein the main body section including the emission optical system out of the projector is detachably attached.

17. An interactive board comprising:
the projector according to claim 7; and
a screen display section including the irradiated surface, and adapted to make it possible to write other information on the irradiated surface,
wherein the main body section including the emission optical system out of the projector is detachably attached.

18. An interactive board comprising:
the projector according to claim 8; and
a screen display section including the irradiated surface, and adapted to make it possible to write other information on the irradiated surface,
wherein the main body section including the emission optical system out of the projector is detachably attached.

* * * * *